US011468019B2

(12) United States Patent
Michels et al.

(10) Patent No.: US 11,468,019 B2
(45) Date of Patent: *Oct. 11, 2022

(54) APPARATUS, SYSTEMS, AND METHODS FOR ANALYZING CHARACTERISTICS OF ENTITIES OF INTEREST

(71) Applicant: Foursquare Labs, Inc., New York, NY (US)

(72) Inventors: Bill Michels, Los Angeles, CA (US); Tyler Bell, Los Angeles, CA (US); Tim Chklovski, Los Angeles, CA (US); Manuel Lagang, Los Angeles, CA (US); Boris Shimanovsky, Los Angeles, CA (US)

(73) Assignee: FOURSQUARE LABS, INC., New York, NY (US)

(*) Notice: Subject to any disclaimer, the term of this patent is extended or adjusted under 35 U.S.C. 154(b) by 316 days.

This patent is subject to a terminal disclaimer.

(21) Appl. No.: 16/409,776

(22) Filed: May 11, 2019

(65) Prior Publication Data

US 2019/0266133 A1    Aug. 29, 2019

Related U.S. Application Data

(63) Continuation of application No. 14/214,309, filed on Mar. 14, 2014, now Pat. No. 10,331,631.

(Continued)

(51) Int. Cl.
*G06F 16/00* (2019.01)
*G06F 16/21* (2019.01)
(Continued)

(52) U.S. Cl.
CPC ......... *G06F 16/21* (2019.01); *G05B 13/0265* (2013.01); *G06F 16/23* (2019.01);
(Continued)

(58) Field of Classification Search
CPC .... G06F 16/9537; G06F 16/951; G06F 16/10; G06F 16/30; G06F 16/3329;
(Continued)

(56) References Cited

U.S. PATENT DOCUMENTS 5,701,467 A    12/1997   Freeston
6,012,053 A *   1/2000   Pant ...................... G06F 16/951
                                                        707/999.005

(Continued)

FOREIGN PATENT DOCUMENTS

CN    102004793 A    4/2011
CN    102955792 A    3/2013
(Continued)

OTHER PUBLICATIONS

Stefan Endrullis et al., "Entity Search Strategies for Mashup Applications", IEEE 28th International Conference on Data Engineering, Apr. 2012, pp. 66-77.*

(Continued)

*Primary Examiner* — Srirama Channavajjala

(57) ABSTRACT

The present disclosure relates to apparatus, systems, and methods for analyzing characteristics of entities of interest. In particular, the present disclosure provides a mechanism for analyzing information about entities of interest and for rating or scoring the entities of interest based on the analyzed information. The rating or the score of an entity of interest can sometimes be referred to as a placerank value of an entity of interest.

21 Claims, 5 Drawing Sheets

Related U.S. Application Data

(60) Provisional application No. 61/800,036, filed on Mar. 15, 2013, provisional application No. 61/799,131, filed on Mar. 15, 2013, provisional application No. 61/799,846, filed on Mar. 15, 2013, provisional application No. 61/799,986, filed on Mar. 15, 2013, provisional application No. 61/799,817, filed on Mar. 15, 2013.

(51) Int. Cl.

| | | |
|---|---|---|
| *G06N 20/00* | (2019.01) | |
| *G06F 16/23* | (2019.01) | |
| *G06F 16/29* | (2019.01) | |
| *G06F 16/35* | (2019.01) | |
| *G06F 16/28* | (2019.01) | |
| *G06F 16/31* | (2019.01) | |
| *G06F 16/951* | (2019.01) | |
| *G06F 16/2458* | (2019.01) | |
| *G06F 16/2455* | (2019.01) | |
| *G06Q 10/10* | (2012.01) | |
| *G06Q 50/00* | (2012.01) | |
| *G05B 13/02* | (2006.01) | |
| *H04W 4/029* | (2018.01) | |
| *H04W 76/38* | (2018.01) | |
| *H04W 4/50* | (2018.01) | |
| *G06Q 30/02* | (2012.01) | |
| *H04L 41/14* | (2022.01) | |
| *H04W 4/02* | (2018.01) | |
| *H04W 4/021* | (2018.01) | |
| *H04W 8/08* | (2009.01) | |
| *H04W 8/16* | (2009.01) | |
| *H04W 8/18* | (2009.01) | |
| *H04W 16/24* | (2009.01) | |
| *H04W 64/00* | (2009.01) | |
| *H04W 88/02* | (2009.01) | |
| *G06N 5/02* | (2006.01) | |
| *G06F 16/335* | (2019.01) | |
| *H04W 16/00* | (2009.01) | |
| *H04W 16/30* | (2009.01) | |
| *H04W 16/32* | (2009.01) | |
| *H04W 88/00* | (2009.01) | |

(52) U.S. Cl.
CPC ........ *G06F 16/235* (2019.01); *G06F 16/2379* (2019.01); *G06F 16/2386* (2019.01); *G06F 16/2477* (2019.01); *G06F 16/24564* (2019.01); *G06F 16/282* (2019.01); *G06F 16/285* (2019.01); *G06F 16/29* (2019.01); *G06F 16/313* (2019.01); *G06F 16/35* (2019.01); *G06F 16/951* (2019.01); *G06N 5/022* (2013.01); *G06N 20/00* (2019.01); *G06Q 10/101* (2013.01); *G06Q 30/0261* (2013.01); *G06Q 30/0282* (2013.01); *G06Q 50/01* (2013.01); *H04L 41/14* (2013.01); *H04W 4/02* (2013.01); *H04W 4/021* (2013.01); *H04W 4/025* (2013.01); *H04W 4/029* (2018.02); *H04W 4/50* (2018.02); *H04W 8/08* (2013.01); *H04W 8/16* (2013.01); *H04W 8/18* (2013.01); *H04W 16/24* (2013.01); *H04W 64/00* (2013.01); *H04W 64/003* (2013.01); *H04W 76/38* (2018.02); *H04W 88/02* (2013.01); *G06F 16/337* (2019.01); *H04W 16/00* (2013.01); *H04W 16/30* (2013.01); *H04W 16/32* (2013.01); *H04W 88/00* (2013.01)

(58) Field of Classification Search
CPC ........ G06F 16/313; G06F 16/21; G06F 16/35; G06F 16/235; G06F 16/282; G06F 16/285; G06F 16/2379; G06F 16/2386; G06F 16/2477; G06F 16/24564; G06F 16/23–24; G06F 16/29

See application file for complete search history.

(56) References Cited

U.S. PATENT DOCUMENTS

| | | | |
|---|---|---|---|
| 6,212,393 B1 | 4/2001 | Suarez et al. | |
| 6,317,604 B1 | 11/2001 | Kovach, Jr. et al. | |
| 6,317,787 B1* | 11/2001 | Boyd | G06F 11/3476 |
| | | | 709/224 |
| 6,360,261 B1 | 3/2002 | Boyd et al. | |
| 6,594,791 B2 | 7/2003 | Sipola | |
| 6,968,332 B1* | 11/2005 | Milic-Frayling | G06F 16/9535 |
| | | | 707/765 |
| 7,058,639 B1 | 6/2006 | Chatterjee et al. | |
| 7,096,214 B1 | 8/2006 | Bharat et al. | |
| 7,137,065 B1 | 11/2006 | Huang et al. | |
| 7,271,765 B2 | 9/2007 | Stilp et al. | |
| 7,330,850 B1 | 2/2008 | Seibel et al. | |
| 7,509,301 B2* | 3/2009 | Schmitt | G06F 16/2471 |
| 7,539,666 B2 | 5/2009 | Ashworth et al. | |
| 7,576,754 B1 | 8/2009 | Joseph et al. | |
| 7,577,680 B1 | 8/2009 | Williams et al. | |
| 7,734,661 B2 | 6/2010 | Jordan et al. | |
| 7,814,106 B2 | 10/2010 | Guido | |
| 7,831,381 B2* | 11/2010 | Thota | G06Q 10/06 |
| | | | 701/426 |
| RE42,285 E | 4/2011 | Anderson et al. | |
| 8,015,185 B2 | 9/2011 | Choi et al. | |
| 8,046,001 B2 | 10/2011 | Shalmon et al. | |
| 8,126,825 B2 | 2/2012 | Guyon | |
| 8,195,709 B2 | 6/2012 | Pulfer | |
| 8,260,769 B1 | 9/2012 | Narieda et al. | |
| 8,301,639 B1 | 10/2012 | Myllykmaki et al. | |
| 8,326,845 B2 | 12/2012 | Sethi et al. | |
| 8,346,795 B2* | 1/2013 | Roulland | G06F 16/3325 |
| | | | 707/723 |
| 8,489,596 B1 | 7/2013 | Milton et al. | |
| 8,538,973 B1 | 9/2013 | Gonzalez et al. | |
| 8,577,330 B2 | 11/2013 | Reagor | |
| 8,589,069 B1 | 11/2013 | Lehman | |
| 8,670,716 B2 | 3/2014 | Yu et al. | |
| 8,745,065 B2* | 6/2014 | Wang | G06F 16/00 |
| | | | 707/748 |
| 8,751,427 B1 | 6/2014 | Mysen et al. | |
| 8,843,315 B1 | 9/2014 | Barbeau et al. | |
| 8,855,681 B1 | 10/2014 | George et al. | |
| 8,869,285 B2* | 10/2014 | Kanda | G06F 16/10 |
| | | | 726/25 |
| 8,909,255 B1 | 12/2014 | Eriksson et al. | |
| 8,918,284 B2 | 12/2014 | Tokashiki | |
| 8,977,284 B2 | 3/2015 | Reed | |
| 9,063,226 B2 | 6/2015 | Zheng et al. | |
| 9,176,986 B2* | 11/2015 | Petrou | G06K 9/72 |
| 9,183,438 B1 | 11/2015 | Dhein | |
| 9,317,541 B2 | 4/2016 | Shimanovsky et al. | |
| 9,544,075 B2 | 1/2017 | Altman et al. | |
| 9,594,791 B2 | 3/2017 | Bell et al. | |
| 9,600,501 B1 | 3/2017 | Fuller | |
| 9,686,646 B1 | 6/2017 | Sorden et al. | |
| 9,715,553 B1* | 7/2017 | Singleton | G06F 16/9537 |
| 9,720,555 B2 | 8/2017 | Sorden et al. | |
| 9,736,652 B2 | 8/2017 | Su et al. | |
| 9,743,236 B1 | 8/2017 | Pecard et al. | |
| 9,753,965 B2 | 9/2017 | Rana et al. | |
| 9,801,095 B2 | 10/2017 | Henderson et al. | |
| 9,906,906 B1 | 2/2018 | Pecard et al. | |
| 9,950,532 B2 | 4/2018 | Togashi et al. | |
| 584,791 A1 | 5/2018 | Bell et al. | |
| 9,977,792 B2 | 5/2018 | Bell et al. | |
| 10,013,446 B2 | 7/2018 | Rana et al. | |
| 10,255,301 B2 | 4/2019 | Bell et al. | |
| 10,268,708 B2 | 4/2019 | Rana et al. | |
| 10,324,935 B1 | 6/2019 | Patton | |

(56) References Cited

U.S. PATENT DOCUMENTS

| | | |
|---|---|---|
| 10,331,631 B2 | 6/2019 | Michel et al. |
| 10,353,934 B1 | 7/2019 | Mehta et al. |
| 10,397,757 B1 | 8/2019 | Gratton et al. |
| 10,459,896 B2 | 10/2019 | Rana et al. |
| 10,484,856 B1 | 11/2019 | Leung et al. |
| 10,579,600 B2 | 3/2020 | Bell et al. |
| 10,817,484 B2 | 10/2020 | Rana et al. |
| 10,866,937 B2 | 12/2020 | Bell et al. |
| 2001/0036224 A1 | 11/2001 | Demello et al. |
| 2002/0028682 A1 | 3/2002 | Fitch et al. |
| 2002/0138571 A1 | 9/2002 | Trinon et al. |
| 2002/0188581 A1 | 12/2002 | Fortin et al. |
| 2003/0036848 A1 | 2/2003 | Sheha et al. |
| 2003/0060211 A1* | 3/2003 | Chern ............... H04W 4/029 455/456.2 |
| 2003/0135486 A1 | 7/2003 | Edlund et al. |
| 2003/0204484 A1 | 10/2003 | Charpiot et al. |
| 2004/0181526 A1 | 9/2004 | Burdick et al. |
| 2004/0185863 A1 | 9/2004 | Ogami |
| 2004/0254920 A1 | 12/2004 | Brill et al. |
| 2005/0015486 A1* | 1/2005 | Hugh ................. G06F 16/30 709/224 |
| 2005/0021845 A1 | 1/2005 | Yasui et al. |
| 2005/0073708 A1 | 4/2005 | Oh et al. |
| 2005/0086360 A1 | 4/2005 | Mamou |
| 2005/0096997 A1 | 5/2005 | Jain et al. |
| 2005/0134935 A1 | 6/2005 | Schmidtler et al. |
| 2005/0240580 A1 | 10/2005 | Zamir et al. |
| 2005/0246616 A1 | 11/2005 | Choi et al. |
| 2006/0004850 A1 | 1/2006 | Chowdhury |
| 2006/0085177 A1 | 4/2006 | Toyama et al. |
| 2006/0089948 A1* | 4/2006 | Picker ............... H04N 21/4622 348/E7.071 |
| 2006/0149774 A1 | 7/2006 | Egnor |
| 2006/0195565 A1 | 8/2006 | De-Poorter |
| 2006/0248106 A1 | 11/2006 | Milne et al. |
| 2006/0253481 A1 | 11/2006 | Guido et al. |
| 2006/0277197 A1 | 12/2006 | Bailey |
| 2006/0287810 A1 | 12/2006 | Sadri et al. |
| 2007/0005556 A1 | 1/2007 | Ganti et al. |
| 2007/0030824 A1 | 2/2007 | Ribaudo et al. |
| 2007/0072582 A1 | 3/2007 | Nurmi |
| 2007/0088603 A1* | 4/2007 | Jouppi ............... G06Q 30/02 705/14.66 |
| 2007/0100796 A1 | 5/2007 | Wang |
| 2007/0112697 A1* | 5/2007 | Ricketts ............. G06F 16/283 706/12 |
| 2007/0149216 A1 | 6/2007 | Misikangas |
| 2007/0245118 A1 | 10/2007 | Suponau et al. |
| 2007/0256006 A1 | 11/2007 | Myers |
| 2008/0077314 A1 | 3/2008 | Ishikawa |
| 2008/0098026 A1* | 4/2008 | Kraft ................. G06F 40/169 707/999.102 |
| 2008/0248815 A1 | 10/2008 | Busch |
| 2008/0255862 A1* | 10/2008 | Bailey ............... G06Q 40/06 707/999.107 |
| 2008/0261611 A1 | 10/2008 | Mia et al. |
| 2008/0261612 A1 | 10/2008 | Mia et al. |
| 2008/0270404 A1* | 10/2008 | Borkovsky ......... G06F 16/951 |
| 2009/0005968 A1 | 1/2009 | Vengroff et al. |
| 2009/0024546 A1 | 1/2009 | Ficcaglia et al. |
| 2009/0089149 A1 | 4/2009 | Lerner et al. |
| 2009/0106228 A1 | 4/2009 | Weinman, Jr. |
| 2009/0119222 A1 | 5/2009 | O'Neil et al. |
| 2009/0124241 A1 | 5/2009 | Krishnaswamy et al. |
| 2009/0125321 A1 | 5/2009 | Charlebois et al. |
| 2009/0132469 A1 | 5/2009 | White et al. |
| 2009/0132605 A1 | 5/2009 | Nielsen |
| 2009/0187553 A1* | 7/2009 | Sarkar ............... G06Q 30/02 707/999.005 |
| 2009/0207021 A1 | 8/2009 | Naccache |
| 2009/0254838 A1 | 10/2009 | Rao et al. |
| 2009/0280829 A1 | 11/2009 | Feuerstein |
| 2009/0282019 A1 | 11/2009 | Galitsky et al. |
| 2009/0287405 A1 | 11/2009 | Liu et al. |
| 2009/0299952 A1 | 12/2009 | Zheng et al. |
| 2009/0302952 A1 | 12/2009 | Chan et al. |
| 2009/0319346 A1 | 12/2009 | Fogel et al. |
| 2010/0004997 A1 | 1/2010 | Mehata et al. |
| 2010/0023515 A1 | 1/2010 | Marx |
| 2010/0323715 A1 | 2/2010 | Winters |
| 2010/0079336 A1 | 4/2010 | Skibiski et al. |
| 2010/0185628 A1 | 7/2010 | Weda et al. |
| 2010/0214117 A1 | 8/2010 | Hazzani |
| 2010/0222081 A1 | 9/2010 | Ward et al. |
| 2010/0305842 A1* | 12/2010 | Feng ................. G01C 21/3679 701/533 |
| 2011/0029853 A1 | 2/2011 | Garrity et al. |
| 2011/0145228 A1 | 6/2011 | Laurenzo |
| 2011/0208427 A1 | 8/2011 | Jansen et al. |
| 2011/0219226 A1 | 9/2011 | Olsson et al. |
| 2011/0225288 A1 | 9/2011 | Easterday et al. |
| 2011/0239051 A1* | 9/2011 | Basu ................. G06F 11/079 714/E11.178 |
| 2011/0246059 A1 | 10/2011 | Feuerstein |
| 2011/0295751 A1* | 12/2011 | Matsuo ............. G06Q 30/0246 705/59 |
| 2011/0313969 A1 | 12/2011 | Ramu |
| 2011/0320319 A1 | 12/2011 | Streich |
| 2012/0028650 A1 | 2/2012 | Cooper et al. |
| 2012/0031032 A1 | 2/2012 | Deiss et al. |
| 2012/0047102 A1 | 2/2012 | Petersen et al. |
| 2012/0047184 A1 | 2/2012 | Purdy |
| 2012/0084280 A1 | 4/2012 | Bouzas et al. |
| 2012/0088220 A1 | 4/2012 | Feng |
| 2012/0089617 A1* | 4/2012 | Frey ................. G06F 16/951 707/E17.084 |
| 2012/0100869 A1 | 4/2012 | Liang et al. |
| 2012/0110183 A1 | 5/2012 | Miranda et al. |
| 2012/0182144 A1 | 7/2012 | Richardson et al. |
| 2012/0185439 A1 | 7/2012 | Chen et al. |
| 2012/0185455 A1 | 7/2012 | Hedrevich |
| 2012/0191696 A1 | 7/2012 | Renkes et al. |
| 2012/0221231 A1 | 8/2012 | Nagata et al. |
| 2012/0221508 A1 | 8/2012 | Chaturvedi et al. |
| 2012/0226622 A1 | 9/2012 | Gonzalez et al. |
| 2012/0066218 A1 | 10/2012 | Rapp et al. |
| 2012/0253862 A1 | 10/2012 | Davidson |
| 2012/0260209 A1 | 10/2012 | Stibel et al. |
| 2012/0278767 A1 | 11/2012 | Stibel et al. |
| 2012/0303745 A1 | 11/2012 | Lo et al. |
| 2012/0317088 A1* | 12/2012 | Pantel ............... G06F 16/972 707/706 |
| 2012/0317110 A1 | 12/2012 | Butterfield et al. |
| 2012/0331014 A1 | 12/2012 | Skubacz et al. |
| 2013/0031032 A1 | 1/2013 | Mehta et al. |
| 2013/0066866 A1 | 3/2013 | Chan et al. |
| 2013/0066912 A1 | 3/2013 | Chetuparambil et al. |
| 2013/0073581 A1 | 3/2013 | Sandholm |
| 2013/0090130 A1 | 4/2013 | Burrell et al. |
| 2013/0103306 A1 | 4/2013 | Uetake |
| 2013/0103607 A1 | 4/2013 | Knipfer et al. |
| 2013/0103697 A1* | 4/2013 | Hill ................... G06F 16/9537 707/748 |
| 2013/0103764 A1 | 4/2013 | Verkasalo |
| 2013/0157693 A1 | 6/2013 | Mercuri et al. |
| 2013/0183998 A1 | 7/2013 | Pylappan et al. |
| 2013/0210463 A1 | 8/2013 | Busch |
| 2013/0226857 A1 | 8/2013 | Shim et al. |
| 2013/0227026 A1 | 8/2013 | Jayaram et al. |
| 2013/0238540 A1 | 9/2013 | O'Donaghue et al. |
| 2013/0246175 A1 | 9/2013 | Bilange et al. |
| 2013/0250851 A1 | 9/2013 | Lakhzouri et al. |
| 2013/0262479 A1 | 10/2013 | Liang et al. |
| 2013/0267255 A1 | 10/2013 | Liu et al. |
| 2013/0304758 A1 | 11/2013 | Gruber et al. |
| 2013/0339353 A1 | 12/2013 | Emmelmann et al. |
| 2013/0346347 A1 | 12/2013 | Patterson et al. |
| 2014/0115009 A1 | 4/2014 | Lashley et al. |
| 2014/0128105 A1 | 5/2014 | Su et al. |
| 2014/0270402 A1 | 9/2014 | Condell et al. |
| 2014/0274022 A1 | 9/2014 | Bell et al. |
| 2014/0274154 A1 | 9/2014 | Rana et al. |

(56) References Cited

U.S. PATENT DOCUMENTS

| | | | |
|---|---|---|---|
| 2014/0274157 | A1 | 9/2014 | Frank et al. |
| 2014/0278838 | A1 | 9/2014 | Novak |
| 2014/0279674 | A1 | 9/2014 | Michels et al. |
| 2014/0279757 | A1 | 9/2014 | Shimanovsky et al. |
| 2014/0279811 | A1 | 9/2014 | Su et al. |
| 2014/0289188 | A1 | 9/2014 | Shimanovsky et al. |
| 2015/0081704 | A1* | 3/2015 | Hannan .............. G06F 16/24 707/736 |
| 2015/0081717 | A1 | 3/2015 | Pidduck |
| 2015/0319574 | A1 | 11/2015 | Wachter et al. |
| 2016/0232192 | A1 | 8/2016 | Shimanovsky et al. |
| 2017/0206223 | A1 | 7/2017 | Bell et al. |
| 2017/0242873 | A1 | 8/2017 | Barrow et al. |
| 2018/0011888 | A1 | 1/2018 | Rana et al. |

FOREIGN PATENT DOCUMENTS

| | | | |
|---|---|---|---|
| WO | WO 2002/010989 | A2 | 2/2002 |
| WO | WO2004107206 | A1 * | 12/2004 |
| WO | WO2008106667 | | 9/2008 |
| WO | WO2008106667 | A1 * | 9/2008 |
| WO | WO2012142553 | * | 10/2012 |
| WO | WO2012173823 | A2 * | 12/2012 |
| WO | WO 2014/145059 | A2 | 9/2014 |
| WO | WO 2014/145069 | A1 | 9/2014 |
| WO | WO 2014/145076 | A2 | 9/2014 |
| WO | WO 2014/145088 | A1 | 9/2014 |
| WO | WO 2014/145104 | A2 | 9/2014 |
| WO | WO 2014/145106 | A1 | 9/2014 |

OTHER PUBLICATIONS

"DAMA Data Management Knowledge System Guidelines", DAMAInternational, p. 226, Beijing: Tsinghua University Publishing House, Jul. 2012) cited in Office action of Application No. CN201480014861.3 with English Translation.
Office Action, Chinese Patent Application No. 201480014828.0, with English \Translation, dated Jan. 2, 2019.
Geohash, Wikipedia, the :free encyclopedia,Jun. 16, 2014, 6 pages http://en.wikipedia org/w/index.php?title=Geohash&oldid=52302473.
Supplementary European Search Report/Opinion EP14725817, dated Dec. 1, 2016, 6 pages.
International Search Report and Written Opinion issued by ISA Application No. PCT/US14/029787 dated Aug. 13, 2014, 9 pages.
Franklin, Michael J., et al. "CrowdDB: answering queries with crowdsourcing." Proceedings of the 2011 ACM SIGMOD.
International Preliminary Report on Patentability for International Application No. PCT/US14/029737 dated Sep. 15, 2015, 7 pages.
Smiley, D. "Lucene 4 Spatial," 2012 Basis Technology, Open Source Conference, Oct. 2, 2012, 16 pages.
International Preliminary Report and Written Opinion for International Application No. PCT/US14/029755 dated Aug. 27, 2014, 10 pages.
Communication pursuant to Rules 161(2) and 162 EPC for European Application No. 14720407.7-1854, dated Nov. 10, 2015, 2 pages.
Communication pursuant to Rules 161(2) and 162 EPC for European Application No. 14720841.7-1951, dated Oct. 30, 2015, 2 pages.
Communication pursuant to Rules 161(2) and 162 EPC for European Application No. 14727983.0-1951, dated Dec. 22, 2015, 2 pages.
Communication pursuant to Rules 161(2) and 162 EPC for European Application No. 14730242.6-1951, dated Oct. 30, 2015, 2 pages.
Communication pursuant to Rules 161(2) and 162 EPC for European Application No. 14725817.2-1951 dated Jan. 5, 2016, 2 pages.
Communication pursuant to Rules 161(2) and 162 EPC for European Application No. 14725818.0-1951, dated Oct. 30, 2015, 2 pages.
Response to Communication pursuant to Rules 161(2) and 162 EPC for European Application No. 14720407.7-1854, submitted on May 10, 2016, 3 pages.
Claims for Response to Communication pursuant to Rules 161(2) and 162 EPC for European Application No. 14720407.7-1854, dated May 10, 2016, 4 pages.
Response to Communication pursuant to Rules 161(2) and 162 EPC for European Application No. 14720841.7, dated Apr. 29, 2016, 9 pages.
Varma, H.P. et al., "A Data Structure for Spatio-Temporal Databases," International Hydrographic Review, Monaco, vol. 67, Issue 1, XP000565997, Jan. 1990, pp. 71-92.
Specification for Response to Communication pursuant to Rules 161(2) and 162 EPC for European Application No. 14720841.7, dated Apr. 29, 2016, 2 pages.
European Search Report for European Application No. 14720841.7, dated Oct. 6, 2016, 7 pages.
European Search Report for European Application No. 14727983.0-1955, dated Dec. 8, 2016, 9 pages.
Response to Communication pursuant to Rules 161(2) and 162 EPC for European Application No. 14725817.2, dated Jul. 11, 2016, 2 pages.
Claims for Response to Communication pursuant to Rules 161(2) and 162 EPC for European Application No. 14725817.2, dated Jul. 11, 2016, 4 pages.
Claims and Response to Communication pursuant to Rules 161(2) and 162 EPC for European Application No. 14725818.0, dated Apr. 29, 2016, 9 pages.
Communication pursuant to Article 94(3) EPC for European Application No. 14730242.6, dated Nov. 14, 2016, 4 pages.
Claims and Response to Communication pursuant to Rules 161(2) and 162 EPC for European Application No. 14727983.0, dated Jun. 23, 2016, 10 pages.
Response to Communication pursuant to Article 94(3) EPC for European Application No. 14730242.6, dated Mar. 15, 2017, 12 pages.
Italiano, et al., "Synchronization Options for Data Warehouse Designs," Computer, IEEE Computer Society, Mar. 2006, pp. 53-57.
Search Report and Written Opinion for International Application No. PCT/US14/029787 dated Sep. 18, 2014, 7 pages.
International Preliminary Report on Patentability for International Application No. PCT/US14/029787 dated Sep. 15, 2015, 4 pages.
Search Report and Written Opinion for International Application No. PCT/US14/029713 dated Nov. 5, 2014, 7 pages.
Search Report and Written Opinion for International Application No. PCT/US14/029784 dated Dec. 17, 2014, 7 pages.
International Preliminary Report on Patentability for International Application No. PCT/US14/029784 dated Sep. 15, 2015, 6 pages.
Search Report and Written Opinion for International Application No. PCT/US14/029755 dated Sep. 18, 2014, 8 pages.
International Preliminary Report on Patentability for International Application No. PCT/US14/029755 dated Sep. 15, 2015, 5 pages.
International Preliminary Report on Patentability for International Application No. PCT/US14/029713 dated Sep. 15, 2015, 6 pages.
Search Report and Written Opinion for International Application No. PCT/US14/029737 dated Dec. 9, 2014, 8 pages.
Xuan Liu et al., "CDAS: A Crowdsourcing Data Analytics System", Proceedings of the VLDB Endowment, vol. 5. No. 10, pp. 1040-1051.
Wilson Wong, et al. "Ontology Learning from Text: A Look Back and Into the Future"; ACM Comouting Surveys (CSUR); vol. 44; Issue 4; Article No. 20; Aug. 2012; pp. 20.1-20.36.
Juan Ramos, "Using TF-IDF to Determine Word Relevance in Document Queries", The First Instructional Conference on Machine Learning (ICML-2003), proceedings of, Dec. 3, 2003, pp. 1-4.
Kevin W. Boyack, David Newman, Russell J. Duhon, Richard Klavans, Michael Patek, Joseph R. Biberstine, Bob Schijvenaars, Andre Skupin, Nianli Ma, Katy Borner, "Clustering More than Two Million Biomedical Publications: Comparing the Accuracies of Nine Text-Based Similarity Approaches", PLos One, vol. 6, issue 3, e18029, Mar. 2011, pp. 1-11.

(56) References Cited

OTHER PUBLICATIONS

Marti A. Hearst and Jan 0. Pedersen, "Reexamining the Cluster Hypothesis: Scatter/Gather on Retrieval Results", SIGIR '96 Proceedings of the 19th annual international ACM SIGIR conference on Research and development in Information retrieval, Aug. 18, 1996, pp. 76-84.

Stanislaw Osi'nski and Dawid Weiss, "A Concept-driven Algorithm for Clustering Search Results", IEEE Intelligent Systems, vol. 20, Issue 3, Jun. 13, 2005, pp. 48-54.

Tian, M. et al., "Efficient algorithms for fast integration on large data sets from multiple sources," BMC Medical Informatics and Decision Making, vol. 12, No. 1, 6 pages (Jun. 28, 2012).

Ahmed Metwally, Christos Faloutsos, "V-SMART-Join: A Scalable MapReduce Framework for All-Pair Similarity Joins of Multisets and Vectors," Journal Proceedings of the VLDB Endowment, vol. 5 Issue 8, Apr. 2012, pp. 704-715.

Anonymous, "SpatialPrefixTree (Lucene 4.0.0 api)," https://web.archive.org/web/20130313072002/http://lucene.apache.org/core/4_0_0/spatial/org/apache/lucene/spatial/prefix/tree/SpatialPrefixTree.html Accessed on Jul. 17, 2017, Published on Mar. 13, 2013, 4 pages.

Oosterom, V. P. et al., "The Spatial Location Code," Proceedings of the International Symposium on Spatial Datahandling, XP-002293525, Aug. 12, 1996, 12 pages.

Samet, H. "Hierarchical Spatial Date Structures," Computer Science Department, Center for Automation Research and Institute for Advanced Computer Studies, University of Maryland, XP-002566914, Jul. 17, 1989, pp. 193-212.

R. Baragalia, G. De Francisci Morales, C. Lucchese, "Document Similarity Self-Join with Map-Reduce," Data Mining (ICDM), 2010 IEEE 10th International Conference on Dec. 13, 2010, pp. 731-736.

Lars Kolb et al., "Learning-based entity resolution with MapReduce," Proceeding CloudDB '11 Proceedings of the third international workshop on Cloud data management, Oct. 24, 2011, pp. 1-6.

Qiaozhu Mei et al., "Automatic Labeling of Multinomial Topic Models," KDD '07 Proceedings of the 13th ACM SIGKDD International conference on Knowledge discovery and data mining, Aug. 12, 2007, pp. 490-499.

EP Examination Report EP14725817.2 dated Jul. 17, 2018.

Michael J Cafarella: "Extracting and Querying a Comprehensive Web Database", Jan. 1, 2009, pp. 1-7 XP055500317, URL:https://database.cs.wisc.edu/cidr/cidr.

Sebastian Hellmann et al.: "DBpedia Live Extraction", Nov. 1, 2009 (Nov. 1, 2009), On The Move To Meaningful Internet Systems: Otm 2009, Springer Berlin Heidelberg, Berlin, Heidelberg, pp. 1209-1223.

Anonymous: "Record linkage—Wikipedia", 1-15 Mar. 13, 2013 (Mar. 13, 2013), XP055500110, URL:https://en.wikipedia.org/w/index.php?title=Record_linkage&oldid=543842434.

Breese, John S., David Heckerman, and Carl Kadie. "Empirical analysis of predictive algorithms for collaborative filtering." Proceedings of the Fourteenth conference on Uncertainty in artificial intelligence. Morgan Kaufmann Publishers Inc., 1998, pp. 43-52.

Wang, Cong, et al. "Achieving usable and privacy-assured similarity search over outsourced cloud data." Infocom, 2012, Proceedings IEEE. IEEE, 2012.

EP Examination report EP18179405, dated Aug. 27, 2018, 9 pages.

Andrei Tamilin et al, Context-aware Mobile Crowdsourcing, PN153073, UBICOMP, 12, pp. 1-4 Sep. 8, 2012.

Office Action,Chinese Patent Application No. 201480014828.0, with EnglishTranslation, dated Jan. 25, 2019.

International Search Report and Written Opinion for International Application No. PCT/US2014/029724, dated Jul. 29, 2014, 11 pages.

Examination Report issued in IN App. No. 3453/KOLNP/2015, dated Jan. 14, 2020, pp. 1-7.

Decision of Rejection translation issued in CN App. No. 2019104757155, dated Sep. 16, 2021, pp. 1-6.

Office Action, Chinese Patent Application No. 2019104757155, dated Mar. 18, 2021, pp. 1-3.

Office Action, Chinese Patent Application No. 2019104757155, dated Jul. 27, 2020, pp. 1-8.

Examination Report issued in IN App. No. 3438/KOLNP/2015, dated Dec. 27, 2019, pp. 1-9.

Office Action, Chinese Patent Application No. 2014800147767, dated May 31, 2018, pp. 1-11.

Office Action, Chinese Patent Application No. 2014800147767, dated Jan. 22, 2019, pp. 1-5.

EP Examination Report, EP Application No. 21163555.2, dated Aug. 10, 2021, pp. 1-6.

Examination Report issued in IN App. No. 3424/KPLNP/2015/2015, dated May 18, 2020 pp. 1-7.

Office Action, Chinese Patent Application No. 201480014828.0, dated Feb. 24, 2018, pp. 1-13.

Office Action, Chinese Patent Application No. 201480014828.0, dated Jun. 26, 2017, pp. 1-38.

Office Action, Chinese Patent Application No. 201480014828.0, dated Aug. 3, 2018, pp. 1-15.

Notice of Reexamination, Chinese Patent Application No. 2014800148613, dated May 18, 2021, pp. 1-26.

Notice of Reexamination, Chinese Patent Application No. 2014800148613, dated Jul. 13, 2021, pp. 1-4.

Communication pursuant to Article 94(3) for EP App. 14725818.0, dated Mar. 21, 2018, pp. 1-8.

Examination Report issued in IN App. No. 3435/KOLNP/2015, dated Jan. 14, 2020, pp. 1-8.

Notice of Reexamination, Chinese Patent Application No. 2014800147112, dated Feb. 9, 2022, pp. 1-26.

Office Action, Chinese Patent Application No. 2014800147112, dated Feb. 27, 2019, pp. 1-27.

Office Action, Chinese Patent Application No. 2014800147112, dated Dec. 18, 2019, pp. 1-41.

EP Examination Report, EP Application No. 14720841.7, dated Oct. 16, 2018, pp. 1-6.

EP Summons to attend Oral Proceedings, Ep Application No. 14720841.7, dated Jun. 17, 2019, pp. 1-10.

Examination Report issued in IN App. No. 3434/KOLNP/2015, dated Jun. 9, 2020, pp. 1-7.

Examination Report issued in IN App. No. 3453/KOLNP/2015, dated Jan. 14, 2020, pp. 1-12.

\* cited by examiner

| Place | Placerank |
|---|---|
| Restaurant Number 1 | 75 |
| Restaurant Number 2 | 52 |
| Restaurant Number 3 | No rank – insufficient information available |
| Restaurant Number 4 | 22 |
| ... | ... |

FIG. 4

APPARATUS, SYSTEMS, AND METHODS FOR ANALYZING CHARACTERISTICS OF ENTITIES OF INTEREST

CROSS-REFERENCE TO RELATED APPLICATIONS

This application is a continuation of U.S. patent application Ser. No. 14/214,309 filed Mar. 14, 2014, entitled "APPARATUS, SYSTEMS, AND METHODS FOR ANALYZING CHARACTERISTICS OF ENTITIES OF INTEREST", which claims the benefit of the earlier filing date under 35 U.S.C. § 119(e), of:
- U.S. Provisional Application No. 61/799,986, filed on Mar. 15, 2013, entitled "SYSTEM FOR ANALYZING AND USING LOCATION BASED BEHAVIOR;"
- U.S. Provisional Application No. 61/800,036, filed on Mar. 15, 2013, entitled "GEOGRAPHIC LOCATION DESCRIPTOR AND LINKER;"
- U.S. Provisional Application No. 61/799,131, filed on Mar. 15, 2013, entitled "SYSTEM AND METHOD FOR CROWD SOURCING DOMAIN SPECIFIC INTELLIGENCE,"
- U.S. Provisional Application No. 61/799,846, filed Mar. 15, 2013, entitled "SYSTEM WITH BATCH AND REAL TIME DATA PROCESSING;" and
- U.S. Provisional Application No. 61/799,817, filed on Mar. 15, 2013, entitled "SYSTEM FOR ASSIGNING SCORES TO LOCATION ENTITIES."

This application is also related to:
- U.S. patent application Ser. No. 14/214,208, filed on Mar. 14, 2014, entitled "APPARATUS, SYSTEMS, AND METHODS FOR ANALYZING MOVEMENTS OF TARGET ENTITIES;"
- U.S. patent application Ser. No. 14/214,296, filed Mar. 14, 2014, now U.S. Pat. No. 9,753,965, entitled "APPARATUS, SYSTEMS, AND METHODS FOR PROVIDING LOCATION INFORMATION;"
- U.S. patent application Ser. No. 14/214,213, filed on Mar. 14, 2014, entitled "APPARATUS, SYSTEMS, AND METHODS FOR CROWDSOURCING DOMAIN SPECIFIC INTELLIGENCE,"
- U.S. patent application Ser. No. 14/214,219, filed on Mar. 14, 2014, entitled "APPARATUS, SYSTEMS, AND METHODS FOR BATCH AND REALTIME DATA PROCESSING;" and
- U.S. patent application Ser. No. 14/214,231, filed on Mar. 14, 2014, entitled "APPARATUS, SYSTEMS, AND METHODS FOR GROUPING DATA RECORDS."

The entire content of each of the above-referenced applications (including both the provisional applications and the non-provisional applications) is herein incorporated by reference.

FIELD OF THE INVENTION

The disclosed subject matter generally relates to data processing apparatus, systems, and methods for analyzing characteristics of entities of interest.

BACKGROUND

Online services provide useful information about an entity of interest. For example, some social networking services provide ratings for quality and price-friendliness of restaurants and coffee shops based on user reviews and/or exclusive reviews by agents. While such information can be handy and useful, it can be unreliable because the information source, from which the ratings are generated, can be unreliable. For example, reviews from certain users can be deliberately misrepresentative because those users may have other ulterior motives. Even if the information source is reliable, the information can be biased because the information is derived from biased sources or a small number of sources. When there are only few reviewers, the information has low statistical significance.

SUMMARY

In general, in an aspect, embodiments of the disclosed subject matter can include an apparatus. The apparatus includes a memory device that is configured to maintain information about an entity of interest, wherein the information includes internal data, external data, and server logs associated with the entity of interest. The apparatus also includes a processor, in communication with the memory device, and configured to run one or more modules. The one or modules are operable to cause the apparatus to retrieve the internal data, the external data, and the server logs about the entity of interest. generate a plurality of features based on the internal data, the external data, and the server logs, and compute a score for the entity of interest based on the plurality of features, wherein the score is indicative of an importance of the entity of interest.

In general, in an aspect, embodiments of the disclosed subject matter can include a method for processing information relating to an entity of interest. The method includes retrieving internal data, external data, and server logs about the entity of interest, generating a plurality of features for the entity of interest based on the internal data, the external data, and the server logs, and computing a score for the entity of interest based on the plurality of features, wherein the score is indicative of an importance of the entity of interest.

In general, in an aspect, embodiments of the disclosed subject matter can include a non-transitory computer readable medium. The non-transitory computer readable medium can include executable instructions operable to cause a data processing apparatus to retrieve internal data, external data, and server logs about the entity of interest, generate a plurality of features for the entity of interest based on the internal data, the external data, and the server logs, and compute a score for the entity of interest based on the plurality of features, wherein the score is indicative of an importance of the entity of interest.

In any one of the embodiments disclosed herein, the apparatus, the method, or the non-transitory computer readable medium can include modules, steps, or executable instructions for receiving, from a computing device, an information request including a query, requesting the apparatus to provide information on one or more entities associated with the query, identifying at least one entity associated with the query based on at least one score associated with the at least one entity, and ordering the at least one entity based on the at least one score using a sorting mechanism prior to providing information on the at least one entity to the computing device.

In any one of the embodiments disclosed herein, the apparatus, the method, or the non-transitory computer readable medium can include modules, steps, or executable instructions for modifying the order of the at least one entity by altering one or more scores by altering one or more scores of the at least one entity based on one or more contextual conditions associated with the information request.

In any one of the embodiments disclosed herein, the one or more contextual conditions associated with the information request can include one or more of: a time at which the information request is received, a geographic location from which the information request is received, an application from which the information request is received, a profile of a user from which the information request is received, and/or a type of the computing device that sent the information request.

In any one of the embodiments disclosed herein, one of the plurality of features comprises summary attributes associated with a particular characteristic of the EOI, and the apparatus, the method, or the non-transitory computer readable medium can include modules, steps, or executable instructions for formatting the internal data, external data, and server logs into structured data having a predetermined data structure, determining a subset of the structured data associated with the particular characteristic of the EOI, and generating the summary attributes of the particular characteristic of the EOI based on the subset of the structured data.

In any one of the embodiments disclosed herein, one of the plurality of features can include an aggregate count of data items, in the internal dataset, relating to the entity of interest.

In any one of the embodiments disclosed herein, one of the plurality of features can include an information request feature indicative of a total number of information requests, received by the apparatus, for information relating to the entity of interest.

In any one of the embodiments disclosed herein, an information request can be associated with one of a plurality of information request types, and the information request feature can also be indicative of a total number of information requests associated with each of the plurality of information request types.

In any one of the embodiments disclosed herein, the plurality of features can be normalized to a common scale.

In any one of the embodiments disclosed herein, the apparatus, the method, or the non-transitory computer readable medium can include modules, steps, or executable instructions for determining an association between the external data and the internal data by matching one or more attributes of the external data to the internal data.

In any one of the embodiments disclosed herein, the apparatus, the method, or the non-transitory computer readable medium can include modules, steps, or executable instructions for computing the score for the entity of interest by computing a weighted combination of the plurality of features associated with the EOI.

In any one of the embodiments disclosed herein, the apparatus, the method, or the non-transitory computer readable medium can include modules, steps, or executable instructions for determining weights for the weighted combination based on importance labels indicating an importance of each of the plurality of features.

In any one of the embodiments disclosed herein, the apparatus, the method, or the non-transitory computer readable medium can include modules, steps, or executable instructions for computing the score for the entity of interest by computing exponentiations of the plurality of features.

DESCRIPTION OF THE FIGURES

Various objects, features, and advantages of the present disclosure can be more fully appreciated with reference to the following detailed description when considered in connection with the following drawings, in which like reference numerals identify like elements. The following drawings are for the purpose of illustration only and are not intended to be limiting of the disclosed subject matter, the scope of which is set forth in the claims that follow.

FIG. 4 illustrates a table illustrating placerank values of a plurality of restaurants in accordance with some embodiments.

DESCRIPTION OF THE DISCLOSED SUBJECT MATTER

Figure 1:
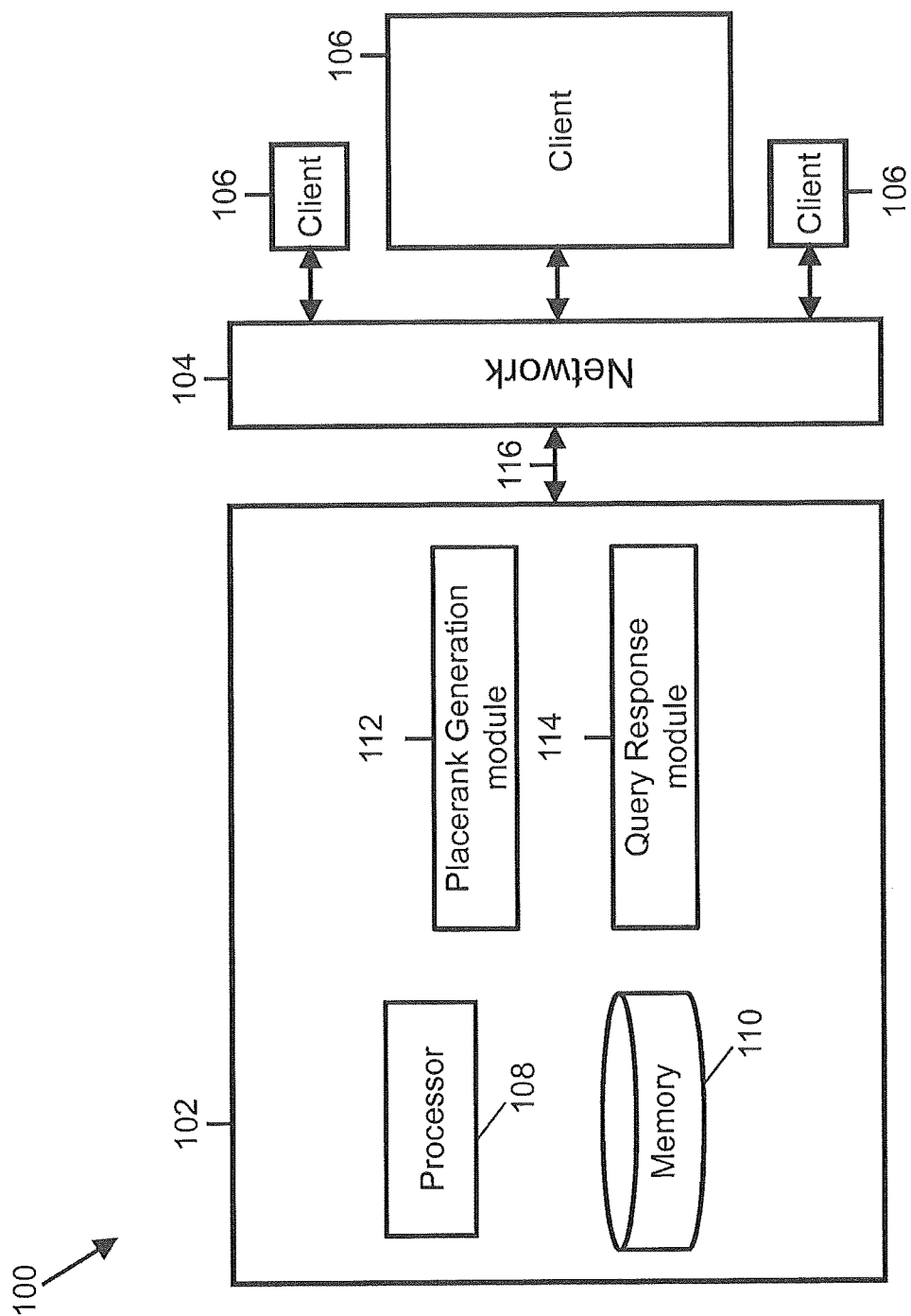
FIG. 1 illustrates a placerank client/server system in accordance with some embodiments.

The present disclosure relates to apparatus, systems, and methods for analyzing characteristics of entities of interest. In particular, the present disclosure provides a mechanism for analyzing information about entities of interest and for rating or scoring the entities of interest based on the analyzed information. The rating or the score of an entity of interest can sometimes be referred to as a placerank value of an entity of interest. In some embodiments, an "entity of interest" (EOI) can include any entity that has a physical location, such as a restaurant, a national park, a store, travel agency, or a coffee shop, or a government entity, such as a registry of motor vehicles, or any other business or non-business entity. In other embodiments, an EOI can include any other types of entities, for example, products, people, buildings, or computers.

At a high level, a placerank value of an EOI is indicative of an importance or relevance of the EOI in view of predetermined characteristics or criteria. For example, a placerank value of an EOI can be indicative of the "family friendliness" of the EOI. In this example, a high placerank value can indicate that the associated EOI is family friendly, whereas a low placerank value can indicate that the associated EOI is not family friendly. In some embodiments, an EOI may be associated with a plurality of placerank values, each associated with particular characteristics or criteria, such as predetermined audience or a predetermined scenario. For example, a restaurant can be associated with three placerank values: placerank.foodie, placerank.social, and placerank.good_for_singles. placerank.foodie can indicate a popularity of the EOI to gourmets; placerank.social can indicate a popularity of the EOI for social events; and placerank.good_for_singles can indicate a popularity of the EOI to singles.

Placerank values can be useful in any systems that are configured to provide EOIs in response to an information request, such as in a client/server system. For example, a client can submit, to a server, an information request including, for example, a search query: "good Chinese restaurants near Greenwich Village, N.Y." In response to the request, the server can provide, to the client, a list of restaurants that (1) serve Chinese style food and (2) are physically located in or near Greenwich Village, N.Y. When the server provides the list of restaurants, the server can be configured to sort the restaurants using one or more placerank values associated with the restaurants. For instance, if the server maintains a "goodness" placerank value of restaurants (e.g., restaurants considered "good" are associated with a higher placerank value compared to restaurants considered "bad",) the server can provide a list of relevant restaurants such that restaurants with higher placerank values (e.g., good restaurants) are presented before restaurants with lower placerank values (e.g., bad restaurants). Similarly, if the server maintains a "price" placerank value of restaurant (e.g., restaurants considered "inexpensive" are associated with a higher placerank value compared to restaurants considered "expensive",) the server can provide a list of relevant restaurants such that restaurants with higher placerank values (e.g., inexpensive restaurants) are presented before restaurants with lower placerank values (e.g., expensive restaurants).

When an EOI is associated with a plurality of placerank values, a server can use one or more of the plurality of placerank values to determine the order of the EOIs. The order of the EOIs can be further adjusted dynamically, for example, based on the specific use case or a client's request.

Such an ordering (or ranking) of EOIs is possible regardless of whether the search query in the information request is textual or geographic, as long as EOIs are associated with a placerank value. A textual search query can include a search string, such as "Chinese Restaurants," entered into an Internet search engine. A geographic search query can include a geographic coordinate, for example, a (longitude, latitude) coordinate such as (40.733855,−73.99386), requesting a list of all EOIs located within a given radius (e.g., 50 meters) of the geographic coordinate.

Placerank values can also be useful in filtering search results. If a placerank value of an EOI is less than a predetermined threshold, a server can hide the EOI from the list of EOIs provided in response to an information request. This mechanism allows a server to discard or hide EOIs that are relatively unimportant (e.g., restaurants that are considered "bad" or "too expensive").

Placerank values can also be useful in selecting one or more mechanisms for displaying information on the client. For example, placerank values can be used to select one or more user interface elements, such as an icon or a font type, for conveying an importance of an EOI within a visual display, such as a map. The selection of an appropriate user interface element allows a client or a user to more quickly find the relevant EOI from the display, such as a map. For instance, in response to an information request for "Chinese Restaurants near Greenwich Village, N.Y.," the server may provide, to the client, a map of Greenwich Village. On that map, the server can display Chinese Restaurants that satisfy the information request. The server can also indicate the quality of the presented Chinese restaurants, based on the "goodness" placerank values associated with these Chinese Restaurants. For example, Chinese Restaurants that are "excellent" may be designated by three stars, Chinese Restaurants that are considered "good" may be designated by two stars, Chinese Restaurants that are considered "acceptable" may be designated by one star, and Chinese Restaurants that are considered "poor" or unacceptable, may not be indicated on the map at all.

Placerank values can also be useful as a part of an analytics system that leverages placerank values to make other conclusions about the EOI associated with the placerank values.

Placerank values can be computed using a placerank computation mechanism. The disclosed placerank computation mechanism can include gathering information about an EOI, generating features for the EOI based on the gathered information, and generating a placerank value for the EOI based on the generated features. In particular, various features, or raw data signals, (e.g. a number of requests for that EOI's record via an application programming interface ("API"), a number of reviews or descriptions or contributions about that EOI from trusted sources (such as blogs that are considered reliable), and a number of times the EOI's Wikipedia page was viewed) are gathered from multiple information sources. Subsequently, these features are scaled and combined using a function to form the EOI's placerank value. In some embodiments, the server can select one or more of the generated features and use only the selected features to compute placerank values. This way, the server can compute placerank values tailored to a particular application.

Unlike existing rating systems, which often only use numerical information to generate its ratings, the disclosed placerank computation mechanism can compute ratings or scores based on various information types. For example, the disclosed placerank computation mechanism can use advertisements about the EOI, textual descriptions of the EOI, which websites describe the EOI and the text on those websites about the EOI, attributes of the EOI, as well as user reviews about the EOI to determine the placerank value of the EOI. The ability to use various information types has significant benefits compared to existing rating systems because the amount of information for computing a placerank value can be significantly greater than the amount of numerical information for computing star-based numerical scores. When the disclosed placerank computation mechanism uses a user review, the disclosed placerank computation mechanism can use not just numerical ratings, but also the tone of the text in the review and the quality/reliability of the review.

The benefit of the disclosed placerank computation mechanism, which considers a variety of information types as further described below, is that the variety of information types can provide a robust signal across many dimensions of interest, some of which may not be explicit. For example, for a social networking service to rate a place as "good for kids", it must ask users to provide an explicit rating for that feature. In contrast, the disclosed placerank computation mechanism can estimate a value for this dimension (e.g., aspect) based on, for example, words in reviews, the websites the review links to, and/or whether the review is on a popular blog amongst mothers. Therefore, the disclosed placerank computation mechanism can allow a service provider to add new dimensions without explicitly asking reviewers to provide the information on such new dimensions.

In addition, the disclosed placerank computation mechanism can provide a reliable signal even in the presence of bad actors seeking to increase the rating associated with their interested entities. For example, to improve a rating on a social networking service, a business owner could potentially ask friends to write reviews or pay outsiders to generate favorable reviews. In contrast, the disclosed placerank computation mechanism considers reviews across many sites, which makes the placerank computation mechanism more robust. Furthermore, the PG module also considers additional information, such as the API traffic, blogs (learning to favor trustworthy blogs), and sites that bad actors cannot collectively compromise. In some cases, significant systematic disagreements across multiple sites may even point to an EOI that is trying to game the online review system.

The function for computing a placerank value can be adapted to a particular characteristic associated with the placerank value. In some embodiments, the adaptation of the function can be performed by using appropriate label data as input variables to the placerank computation. For example, the function for computing a placerank value can use, as an input, social labels of the EOI. The social labels can include a number of check-ins or a number of likes gathered from social networking services. This allows the function to compute a placerank value that can be useful for finding EOIs with social importance (e.g., the placerank value is higher for EOIs with more social importance.) As another example, the function for computing placerank values can use, as an input, medical labels associated with EOIs, such as contributions from the National Provider Identifier ("NPI") registry. This allows the function to compute a placerank value that can be useful for searching medical providers (e.g., the placerank value is higher for EOIs relating to medical service providers.) In other embodiments, the adaptation of the function can be performed by training the function using appropriate label data. For example, the function can be trained using social labels so that the function can compute placerank values that are correlated with social importance. As another example, the function can be trained using medical labels so that the function can compute placerank values correlated with medical service providers.

FIG. 1 illustrates a diagram of a placerank client/server system in accordance with some embodiments. The system 100 includes a server 102, a communication network 104, and one or more client devices 106. The server 102 can include a processor 108, a memory device 110, a placerank generation (PG) module 112, a query response (QR) module 114, and one or more interfaces 116.

The processor 108 of the server 102 can be implemented in hardware. The processor 108 can include an application specific integrated circuit (ASIC), programmable logic array (PLA), digital signal processor (DSP), field programmable gate array (FPGA), or any other integrated circuit. The processor 108 can also include one or more of any other applicable processors, such as a system-on-a-chip that combines one or more of a CPU, an application processor, and flash memory, or a reduced instruction set computing (RISC) processor. The memory device 110 of the processor 108 can include a computer readable medium, flash memory, a magnetic disk drive, an optical drive, a programmable read-only memory (PROM), and/or a read-only memory (ROM).

The PG module 112 can be configured to generate a placerank value for one or more entities of interest (EOIs). The PG module 112 can maintain the generated placerank values in the memory device 110 or provide the generated placerank values to the QR module 114. The QR module 114 can be configured to respond to information requests from one or more clients 106, in batch or in real-time. In some embodiments, the PG module 112 and the QR module 114 can reside in the same server 102. In other embodiments, the PG module 112 and the QR module 114 can reside in different servers.

In some embodiments, the PG module 112 and/or the QR module 114 can be implemented in software stored in the non-transitory memory device 110, such as a non-transitory computer readable medium. The software stored in the memory device 110 can run on the processor 108 capable of executing computer instructions or computer code.

In some embodiments, the PG module 112 and/or the QR module 114 can be implemented in hardware using an ASIC, PLA, DSP, FPGA, or any other integrated circuit. In some embodiments, the PG module 112 and the QR module 114 can both be implemented on the same integrated circuit, such as ASIC, PLA, DSP, or FPGA, thereby forming a system on chip.

The server 102 can include one or more interfaces 116. The one or more interfaces 116 provide an input and/or output mechanism to communicate internal to, and external to, the server 102. For example, the one or more interfaces 116 enable communication with clients 106 over the communication network 104. The one or more interfaces 116 can also provide an application programming interface (API) to other servers or computers coupled to the network 104 so that the server 102 can receive information based on which placerank values can be computed. The one or more interfaces 116 are implemented in hardware to send and receive signals in a variety of mediums, such as optical, copper, and wireless, and in a number of different protocols some of which may be non-transitory.

Although FIG. 1 represents the server 102 as a single server, the server 102 can include more than one server and can be part of a cloud-computing platform.

A client 106 can include a desktop computer, a mobile computer, a tablet computer, a cellular device, or any other computing devices having a processor and memory. The server 102 and the one or more client devices 106 can communicate via the communication network 104.

The communication network 104 can include the Internet, a cellular network, a telephone network, a computer network, a packet switching network, a line switching network, a local area network (LAN), a wide area network (WAN), a global area network, or any number of private networks currently referred to as an Intranet, and/or any other network or combination of networks that can accommodate data communication. Such networks may be implemented with any number of hardware and software components, transmission media and network protocols. Although FIG. 1 represents the network 104 as a single network, the network 104 can include multiple interconnected networks listed above.

Figure 2:
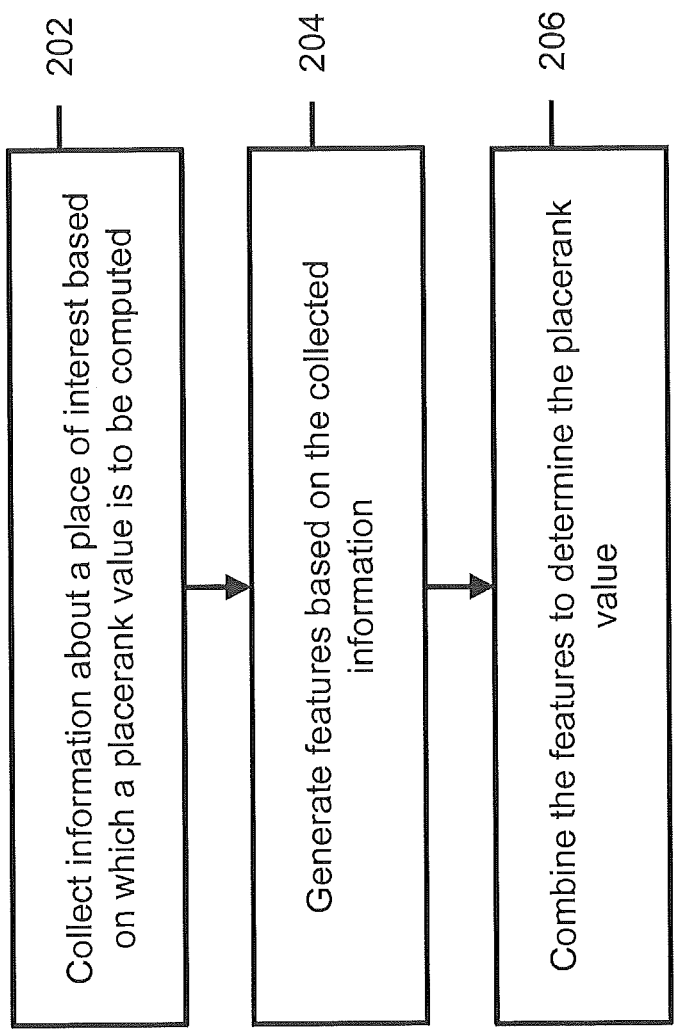
FIG. 2 shows a method for computing a placerank value of an entity of interest (EOI) in accordance with some embodiments.

FIG. 2 illustrates a method for computing a placerank value of an EOI in accordance with some embodiments. At a high level, the PG module 112 can be configured to compute a placerank value in three steps. In step 202, the PG module 112 is configured to collect information about the EOI, based on which a placerank value can be computed. In step 204, the PG module 112 is configured to generate features based on the collected information. In step 206, the PG module 112 is configured to combine the generated features to determine the placerank value for the EOI.

Figure 3:
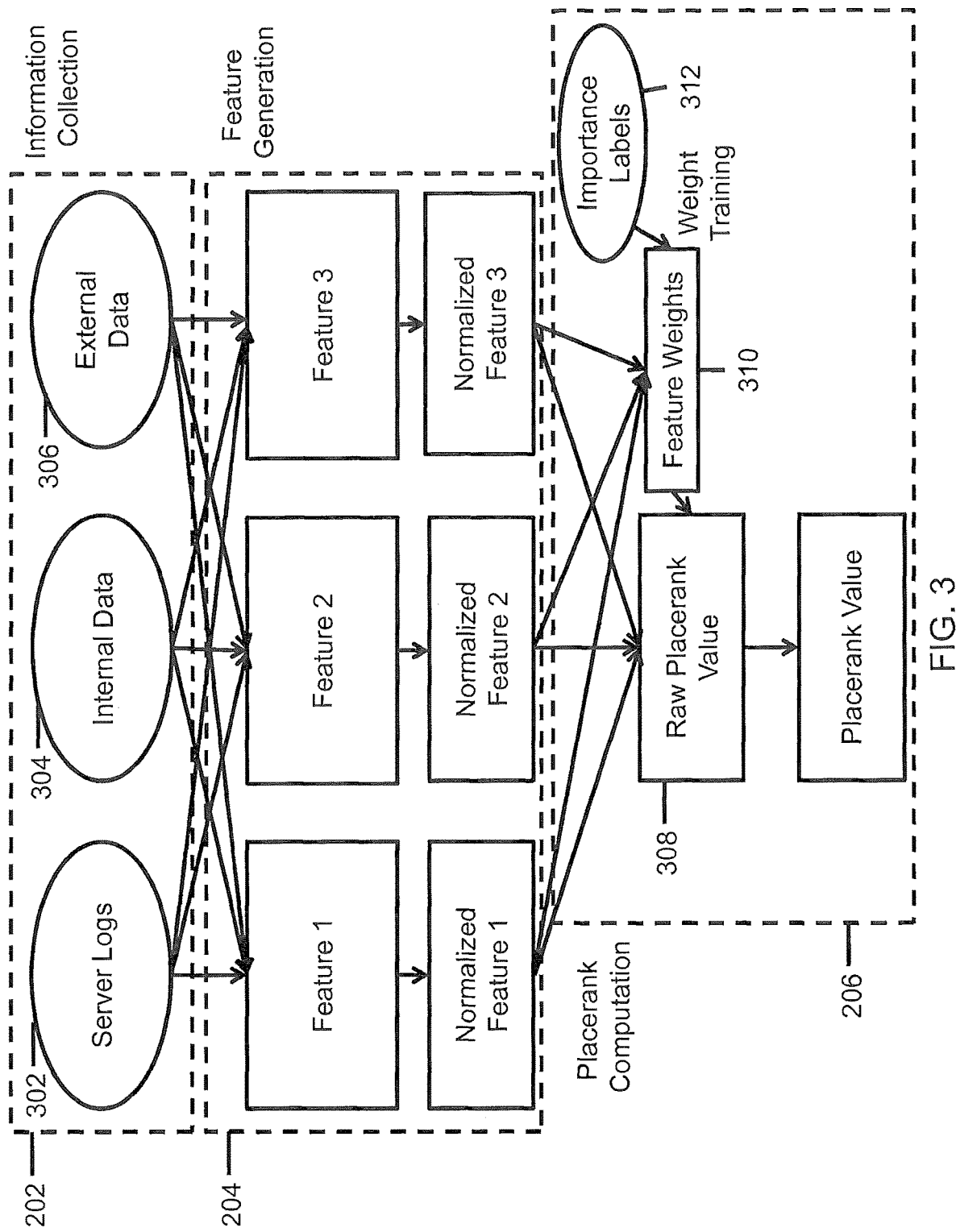
FIG. 3 illustrates a pipeline diagram for computing a placerank value of an EOI in accordance with some embodiments.

FIG. 3 illustrates a detailed pipeline diagram of the method described with respect to FIG. 2 in accordance with some embodiments. In FIG. 3, inputs to the PG module 112 are illustrated as ovals; quantities used by the PG module 112 are illustrated as rectangles; the placerank value produced by the PG module 112 are shown in the rectangle at the bottom of the diagram; and arrows indicate how data propagates through the illustrated quantities (e.g., "Feature 1" is produced using the "Server Logs," "Internal Data" and "External Data" inputs).

In some embodiments, as discussed with respect to FIG. 2, the PG module 112 is configured to compute a placerank value in three steps. In step 202, the PG module 112 is configured to collect information about the EOI from a variety of information sources. In some embodiments, the variety of information sources can include server logs 302, internal database 304 maintaining internal data associated with the EOI, and external database 306 maintaining external data associated with the EOI.

In some embodiments, the internal data can include previously acquired data about the EOI, and it can generally refer to data and metadata about the EOI in a local set of databases. In some cases, the internal data can be gathered or generated by employees or contractors working for the operator of the server 102 (e.g., an entity that generates the placeranks).

In some embodiments, the external data generally refers to data that can be accessed from external databases, websites, or Application Programming Interfaces (APIs). For example, there are sites that keep track of number of page requests on Wikipedia for a particular Wikipedia page. If that page is about an EOI, such as the Eiffel Tower, and if the Wikipedia page for the EOI is popular, it can cause the PG module 112 to provide a higher placerank value to that EOI. The external data can also include information from the Internet gathered by, for example, a web crawler that collects information on webpages, freely available datasets, or partner datasets.

In some embodiments, the server logs, for example, track all requests to a web or an API server. Some of those requests are for a specific EOI. The PG module 112 can use the number of such requests, frequency rate, and changes in request rate as features to determine the placerank value for the specific EOI.

Working with the internal data, external data, and the server logs can be challenging because it means managing internal data along with having to connect to many external services, resolving the EOI (e.g., identifying and consolidating all data referencing a particular EOI across many services, and interpreting data in various formats. The PG module 112 is capable of addressing these issues, as described further below.

In step 204, the PG module 112 can be configured to generate features for the placerank computation based on the information retrieved in step 202. The PG module 112 can generate the features based on one or more of the collected information types. Although FIG. 3 illustrates using only three features, the PG module 112 can use additional features for computing the placerank value. For example, when the PG module 112 computes a placerank value for a restaurant, the "feature 1" can represent an "expense" (e.g., with more expensive restaurants receiving a higher value for this feature and less expensive restaurants receiving a lower value for this feature), the "feature 2" can represent "quality" (e.g., with better restaurants receiving a higher value for this feature), and the "feature 3" can represent "cleanliness". The PG module 112 can also use other features not illustrated in FIG. 3, for example, the "child friendliness" feature (e.g., is it a restaurant that welcomes families with young children) or the "availability of valet parking" feature.

In some embodiments, the PG module 112 can be configured to access a list of EOIs. The list of EOIs can include (1) a unique identifier of each EOI and (2) one or more features associated with the unique identifiers. In some cases, the list of EOIs can be stored in the memory device 110 in the server. In other cases, the list of EOIs can be stored in a database in communication with the server 102.

In some embodiments, the server 102 is configured to receive an information request for an EOI from one or more clients 106, requesting the server 102 to provide information about the EOI stored in an internal database. The information request can be received via a public API endpoint. In some cases, an information request can be associated with one of a plurality of information request types. The information request types can include a search request type or a direct EOI identification request type. An example of an information request associated with the search request type can be a textual string, such as "Chinese restaurants in New York." An example of an information request associated with the direct EOI identification request type can be a textual string, such as "World Trade Center in New York."

In some embodiments, the PG module 112 can use the information requests to derive an information request feature for the placerank value computation. The information request feature can include one or more of (1) a total number of information requests, (2) a total number of each information request type, and/or (3) a list of origins of the information requests, such as an IP address associated with clients sending the information requests. The PG module 112 can use a snapshot of the information request feature and its time-dependent characteristics to find time-dependent popularity of EOis.

In some embodiments, during the construction of the internal database 304, the server 102 can determine and maintain an aggregate count (e.g., a number) of data items, in the internal database 304, relating to each EOI. The PG module 112 can use the aggregate count as a feature for the placerank computation. For example, the PG module 112 can determine the total number of data items that contributed to the association between the "category" attribute of the EOI and the value "Restaurants". The PG module 112 can use this number of data items as a feature for social relevance.

In some embodiments, the server 102 can associate (or link) external data in the external database 306 to internal data in the internal database 304. In some cases, the server 102 can automatically determine such association by matching certain attributes of the external data to the internal data. For example, the server 102 can automatically determine the association between a Wikipedia page (i.e., external data) and the internal data by matching the title of the Wikipedia page to the "name" attribute of EOis in the internal database 304. Once the server 102 determines the association, the PG module 112 can use information in the Wikipedia page to derive a feature for the associated EOI in the internal database 304. In some embodiments, the server 102 may associate (or link) external data in the external database 306 to internal data in the internal database 304 using the apparatus, systems, and methods as described in "APPARATUS, SYSTEMS, AND METHODS FOR GROUPING DATA RECORDS," identified by U.S. patent application Ser. No. 14/214,231, filed on Mar. 14, 2014, the entire content of which is hereby incorporated by reference herein in its entirety.

In some embodiments, the PG module 112 can be configured to generate features based on a record associated with the EOI. The record can include a name of the EOI, an address of the EOI, a phone number of the EOI, and/or a category of the EOI (e.g. the EOI is a restaurant or a concrete manufacturer). The record can also include a number of physical visits received by the EOI. For instance, the record can include a number of customers that visited a restaurant over a predetermined period, a number of patrons that visit a particular library, or a number of people that have their drivers' license renewed at a particular location of the registry of motor vehicles. The record can also include a number of online visits received by the EOI. For instance, the record can include a number of times a restaurant's home web page is visited by Internet users, or a number of online purchases made from a store's web page. The record of the EOI can also include an indication of whether the record associated with the EOI is complete (e.g. whether the record associated with the EOI includes an address and a phone number associated with the EOI). Because the record information can be generated directly from retrieving information associated with the EOI, the information generation from the EOI's record can be simple.

In some embodiments, the PG module 112 can be configured to generate features from references to the EOI on the external dataset, such as the Internet and/or web pages. For example, the PG module 112 can be configured to determine how many web pages mention the EOI, how many reviews the EOI has received, an age of reviews or postings relating to the EOI, an average rating of the EOI from reviews, and/or a relative popularity of web pages and reviews mentioning the EOI.

In some embodiments, when the PG module 112 generates a feature from a review of the EOI, the PG module 112 can use the tone of the text in the review as an additional feature. The PG module 112 can be configured to determine the tone of the review using the steps of converting words, in the text of a review, into a data structure, and determining the tone based on the data structure. For example, in the training phase, the PG module 112 can collect one or more words and maintain a mapping of those words to certain emotions or adjectives about an entity. This allows the PG module 112 to build a mapping from words to emotions or adjectives. Subsequently, in the testing phase, the PG module 112 can gather words from the review of interest, and use the mapping to determine emotions or adjectives associated with the words. Then, the PG module 112 can accumulate the scores (e.g., a count) of those emotions or adjectives over words in the entire review to determine a tone of the review. As another example, the PG module 112 can use natural language processing techniques to parse and interpret prose about the EOI into, for example, a parse tree, and apply statistical models that consider part of speech, counterfactual elements, context, and other such information, to estimate the tone. In some embodiments, the tone extraction can be performed periodically.

In some embodiments, when the PG module 112 generates a feature from a review of the EOI, the PG module 112 can use the quality of the review (or a website that includes the review) as an additional feature. In some cases, the PG module 112 can be configured to determine the quality of the review (or a website that includes the review) through human computation. For instance, the PG module 112 can request one or more persons to annotate whether a particular review or a particular source of a review is reliable. Human computation can be provided using a human computation engine, such as Amazon Mechanical Turk. Human computation can be unreliable, especially when the person(s) performing the human computation is unreliable. To increase the reliability of human computation, the PG module 112 can distribute the annotation task only to person(s) with high ratings from prior human computation tasks. In some embodiments, the PG module 112 can distribute the annotation task to multiple people and consolidate (e.g., average or smooth out) the annotation results from the multiple people to further improve the reliability of human computation. In some cases, the PG module 112 can be configured to automatically annotate a new data source as reliable by comparing data in the new data source to data in a known, reliable data source. If the data in the new data source agrees with the data in the known, reliable data source, then the new data source is likely reliable as well.

In some embodiments, the PG module 112 can be configured to generate features based on references to the EOI on one or more social networking services. For instance, the PG module 112 can be configured to use a number of "likes" for the EOI, a number and/or frequency of tweets relating to the EOI, and/or a number and/or rate of check-ins. The PG module 112 can receive the references to the EOI on one or more social networking services via a variety of communication techniques, such as application programming interface (API) calls to social networking services, including a firehose (or subset) access to Twitter. In some embodiments, the PG module 112 can download references to the EOI on one or more social networking services periodically, and update them accordingly in a local database or a local memory device 110. The PG module can then resolve and annotate the EOI identifications using the downloaded references. In other embodiments, the PG module 112 can download references to the EOI on one or more social networking services in real-time.

In some embodiments, the PG module 112 can be configured to generate features based on web logs and/or API logs. The server 102 can be configured to maintain a log of data traffic relating to the EOI, which can measure the rate of requests for a given EOI to a web server or an API server. For example, the data traffic can indicate a number of requests for a given EOI to a web server or an API server. The log can indicate a time and frequency at which a particular API was used by clients 106 to access information maintained by the server 102. The log can also indicate an identification of clients 106, such as an Internet Protocol (IP) address, that accessed information maintained by the server 102. For instance, the server 102 can maintain how many times clients/users access information relating to a particular EOI, and how many independent clients/users access information relating to a particular EOI. The PG module 112 can parse such logs to generate features to be used for the placerank computation. For example, the PG module 112 can parse an http log, which includes the time and paths referencing certain EOIs. The http logs, as shown below, are formatted as [IP address, timestamp, used method, path, protocol, response code].

10.0.1.1—[29/Mar/2013:11:18:25-0700] "GET/EOI/SOME_ENTITY_ID1 HTTP/1.1" 200
    10.0.1.2—[29/Mar/2013:11:17:25-0700] "GET/EOI/SOME_ENTITY_ID2 HTTP/1.1" 200

In some embodiments, the PG module 112 can be configured to use summary attributes of the EOI as features associated with the EOI. The summary attributes associated with the EOI can be derived from the information collected in step 202, as disclosed in U.S. Provisional Patent Application No. 61/799,846, titled "SYSTEM WITH BATCH AND REAL TIME DATA PROCESSING," filed on Mar. 15, 2013, which is herein incorporated by reference in its entirety. For example, the PG module 112 is configured to generate summary attributes by formatting unstructured input data into structured data having a predetermined data structure. Then, the PG module 112 is configured to group the structured data into a plurality of groups, each associated with a particular EOI. Then the PG module is configured to generate a representative identifier for each group. Subsequently, the PG module 112 can generate summary attributes (or summary data) for each group based on the input data associated with the particular group for the ROI.

For example, when input data includes 5 data items associated with a restaurant A, the PG module 112 can determine that those 5 data items are associated with the same EOI (e.g., the restaurant A), and determine summary data associated with the 5 data items. For instance, if 3 data items indicate that the restaurant A has valet parking and 2 data items indicate that the restaurant A does not have valet parking, then the PG module 112 can summarize (e.g., average or smooth out) the 5 data items using a majority voting scheme and indicate that the EOI has a valet parking.

In some embodiments, the PG module 112 can use metadata to compute the summary attributes. The metadata can include, for example, references to (1) a source from which the input data originates, (2) a user identification that contributed the input data, and/or (3) a data on which the input data was contributed. The summary attributes can include, for example, (1) a number of data items in the collected information, (2) a list of contributing user identifications, (3) a time stamp of the collected information indicating the accuracy of the collected information, and/or (4) a number of times a particular EOI has appeared throughout the collected information, which may embody information on a popularity of the ROI.

Other features that can be used by the PG module 112 can include a number of information requests received by the PG module via a particular API; a number of information sources contributing to the computation of the EOI's placerank value; a number of occurrences or references to the EOI on the Internet, also referred to as a number of external crosswalk references (e.g. references to the EOI's profile pages in social network websites); a category of the EOI (e.g., Chinese restaurant, Indian restaurant, Thai restaurant); a number of visits received by the EOI's Wikipedia page; a number of check-ins at social networking sites; a social weight of the category associated with the EOI; a number of reviews associated with the ROI; and/or a number of user-contributed reviews on social networking sites.

In some embodiments, the PG module 112 can also use, as a feature, the amount of information associated with an EOI (e.g., a number of data points associated with the EOI). In some cases, EOIs with more information can correlate with more popular entities since they generally are more discussed on the web and are documented in greater detail. For example, a famous restaurant often has many reviews, advertisements, and listings, including details about the name of the chef, the number of tables, and whether the restaurant is accessible by handicapped persons. In contrast, less popular restaurants may have fewer reviews and entries, and even when there are reviews and entries, they may be less filled out, for example, with only the name and the address. The PG module 112 can learn this correlation and favor EOI with more details as more likely to be important.

In some embodiments, the PG module 112 can be configured to normalize the features. The feature normalization step can provide that features have similar ranges and prevent outliers from dominating (or biasing) the placerank value disproportionately.

In some cases, features are all normalized to a common scale. For example, the features can be normalized so that that the features all have values in the range of [0, 1] (e.g., each normalized feature has a minimum value of zero, a maximum value of one, and can have any value in between those extreme values). In some cases, the normalization can be performed using a cumulative distribution function of an exponential distribution. Parameter of the exponential distribution for the features can be set such that the mean or median of each feature is given the same normalized value, for example, 0.5.

In some embodiments, the PG module 112 can be configured to use the same (or a small number of) data structure type to represent generated features. In some embodiments, the PG module 112 can use a data structure in accordance with the Scarecrow platform, disclosed in U.S. Provisional Patent Application No. 61/799,131, titled "SYSTEM AND METHOD FOR CROWD SOURCING DOMAIN SPECIFIC INTELLIGENCE," filed on Mar. 15, 2013, which is herein incorporated by reference in its entirety. In other words, the PG module 112 can use a data structure predetermined by a person having an expertise in a particular application of a feature. In other embodiments, the PG module 112 can determine, on its own, the data structure for a feature and automatically populate some or all of the fields in the data structure. For example, the PG module 112 can determine whether data from a data source is changing over time. The PG module 112 can determine that the portion of the data that does not change over time is the label (or an identifier) of a feature, and the portion of the data that does change over time is the value of the feature. Therefore, the PG module 112 can subsequently populate the data structure based on the determined label of a feature and the determined value of the feature.

In step 206, the PG module 112 is configured to generate a placerank value based on the generated features (or the normalized features). In some cases, the PG module 112 can use a function to aggregate the values of the generated features (or the normalized features). The output of the function can be a raw placerank value 308. The function can be configured so that popular EOIs are assigned higher placerank values compared to unpopular EOIs. For example, restaurants that receive more physical customer visits can have a higher placerank than restaurants that receive fewer physical customer visits.

In some embodiments, the PG module 112 is configured to compute the raw placerank value 308 by operating a function that, in part, performs a weighted combination of exponentiated feature values. For example, the function for computing the raw placerank value 308 can be represented as:

$$PR = \sum_{i \in I} \omega_i \{1 - \exp\{-\lambda_i f_i\}\}$$

where $\omega_i$ represents a feature weight for the $i^{th}$ feature $f_i$, $\lambda_i$ is a feature scaling rate for the $i^{th}$ feature $f_i$, and I is a set of indices referring to all features. The feature $f_i$ indicates the raw feature value associated with the $i^{th}$ feature. The feature weight $\omega_i$ indicates an importance of the $i^{th}$ feature $f_i$. For example, a higher feature weight $\omega_i$ can be indicative of the fact that the $i^{th}$ feature $f_i$ is more useful in determining the placerank value compared to other features with lower feature weights. The feature scaling rate $\lambda_i$ is a normalization constant. In other words, the feature scaling rate $\lambda_i$ is used to map the range of the raw feature value $f_i$ to [0, 1]. A higher scaling rate $\lambda_i$ can be indicative of the fact that that the range of the associated raw feature value $f_i$ is small, and thus need to be amplified to be mapped to the range of [0, 1]. A lower scaling rate $\lambda_i$ can be indicative of the fact that that the range of the associated raw feature value $f_i$ is large, and thus need to be reduced to be mapped to the range of [0, 1], where [0, 1] refers a range starting between (and including) 0 and 1. Thus, $\lambda_i f_i$ can be referred to as a normalized feature value.

In other embodiments, the PG module 112 is configured to compute the raw placerank value 308 by operating a function that linearly combines the weighted normalized feature values. For example, the function for computing the raw placerank value 308 can be represented as:

$$PR = \sum_{i \in I} \omega_i \lambda_i f_i$$

where $\omega_i$ represents a feature weight for the $i^{th}$ feature $f_i$, $\lambda_i$ is the feature scaling rate, and I is a set of indices referring to the features.

Once raw placerank values are generated, they can be used to produce the final placerank value. In some embodiments, after the placerank values are computed for all EOIs, the placerank values can be scaled to the range of [0, 100] to roughly match percentiles, where [0, 100] refers a range starting between (and including) 0 and 100. For example, a placerank value of 85 can be indicative of the fact that the corresponding EOI has a higher placerank value than about 85% of the EOIs. This process of producing the final placerank value is called "Percentile Normalization."

In some cases, if available information is insufficient to produce a reliable placerank value for a EOI, then that EOI can be flagged as such. For example, a placerank value of −1 is reserved to indicate that the EOI is not associated with a placerank value because, for instance, there is not enough information for computing the placerank for this EOI, or, for instance, the placerank value of the EOI should not be provided to clients due to predetermined restrictions. FIG. 4 illustrates an exemplary table illustrating placerank values of a plurality of restaurants in accordance with some embodiments.

In some embodiments, the function for computing the placerank values can be periodically updated and the set of placerank values can be reproduced when the function is so updated. One way to update the function is to re-weight underlying features using machine learning techniques. For example, during a recession, lower priced restaurants can be biased to receive higher placerank value. As another example, if a source of collected information falls in quality, the weights attributed to features from that source can be reduced. Continuing that example, an individual's online blog could be a source of features used to produce placerank values. If the person's blog rates restaurants (e.g., as "excellent" or "terrible"), the PG module 112 can extract those ratings from the blog and use them as features for the placerank computation. As long as the person's blog is considered a reliable information source, the features generated from the blog can be considered important (or given high weights) in producing placerank values. However, if the PG module 112 determines that the person's blog is no longer reliable, the importance (or weights) of features generated from that blog can be decreased.

In some embodiments, the PG module 112 can use machine learning techniques to automatically determine (or learn) feature weights $\omega_i$ for the $i^{th}$ feature $f_i$. The process of determining the feature weights can be referred to as weight training.

In some embodiments, the PG module 112 can use normalized feature values $\lambda_i f_i$ in the training set to determine the feature weights $\omega_i$ 310. In particular, the PG module 112 can be configured to use the normalized feature values $\lambda_i f_i$ and importance labels 312 to generate feature weights $\omega_i$ 310, such that the features that are reliable predictors of the given importance label 312 are assigned higher weights.

In some cases, the PG module 112 can generate the entire set of feature weights $\omega_i$, $i \in I$, collectively referred to as $\omega$, using a supervised learning technique. For example, the PG module 112 can receive a labeled training set, and use the labeled training set to find the feature weights $\omega$ that satisfy the following:

$$\omega = \underset{\omega}{\mathrm{argmin}} \left\{ PR - \sum_{i \in I} \eta(\omega_i) \right\}$$

where $\eta$ refers to a placerank estimator, PR refers to the labeled placerank value, in the training set, to be estimated from the features $f_i$, $i \in I$ using the placerank estimator $\eta$; and g is a cost function. As discussed above, the placerank estimator $\eta$ can include $\eta(\omega_i) = \omega_i \lambda_i f_i$ or $\eta(\omega_i) = \omega_i \{1 - \exp\{-\lambda_i f_i\}\}$. The cost function g can include a linear function, a logarithm function, an exponential function, a non-linear function, or any other functions that can penalize a difference between the labeled placerank value and the placerank value estimated by the placerank estimator $\eta$. In other cases, the PG module 112 can generate feature weights $\omega$ using linear regression, non-linear regression, kernel regression, Bayesian techniques, such as Naïve Bayesian, and/or gradient descent techniques.

The importance labels 312 can be indicative of which features are important in determining the placerank values. The importance labels 312 can be indicative of 1) a popularity of an EOI and/or a feature, 2) an importance of a feature from the perspective of consumers on the Internet, 3) an importance of a feature from the perspective of critics or reviewers, and/or 4) an importance of a feature from the perspective of the associated industry. The importance labels 312 can be used to optimize the placerank system for a particular application (e.g., a use case). Therefore, the importance labels 312 can be added based on a user demand. For example, if a user wants to find a dentist that causes the least amount of pain, then the user can add, to the importance labels 312, a "placerank_dentists_who_dont_hurt" label.

In some embodiments, the popularity of an EOI and/or a feature can be determined based on the information request feature, as discussed previously. For example, the popularity of an EOI and/or a feature can be estimated based on the number of information requests received for the EOI and/or the particular feature of the EOI. In some embodiments, the importance label 312 can be updated in real-time as the rate at which the information requests for the EOI are received fluctuates over time. This training process can be done in either a batch or real-time manner, using machine learning methods such as regression, batch, mini-batch or stochastic gradient descent.

In some embodiments, the PG module 112 can periodically reproduce placerank values in a batch mode. For example, the PG module 112 can periodically retrieve all collected information and re-compute placerank values for EOIs. In some embodiments, the PG module 112 can continually update the placerank values in real-time as new or updated information becomes available or as the importance labels are updated. The manner in which the placerank values can be updated in a batch mode and in real time simultaneously is further described in the U.S. Provisional Patent Application No. 61/799,846, titled "SYSTEM WITH BATCH AND REAL TIME DATA PROCESSING," supra.

In some embodiments, the PG module 112 can use a specific, targeted function for computing a placerank value when a general function produces poor quality. In particular, the PG module 112 can be configured to use a different function for computing placerank value based on the type of the placerank value, characteristics of the EOI associated with the placerank value, a type of the EOI associated with the placerank value. For example, the PG module 112 can be configured to use different weights to combine features when the EOI is within a specific country, region, locality, or by industry category or sub-category. In other words, the PG module 112 may use a first function for producing placerank values for restaurants in New York City and may use a second function for producing placerank values for restaurants in Boston. As another example, the PG module 112 can be configured to use different weights to combine features when the placerank value to be computed is associated with a particular type, such as "family friendliness," "proximity to subway stations," or "price." In some embodiments, the PG module 112 can learn the specific, targeted function using a supervised learning technique. For example, the PG module 112 can learn the specific, targeted function by learning a regression mapping (e.g., a function or a table) that maps the characteristics of the EOI or the type of the placerank value to the desired specific, targeted function or parameters of the specific, targeted function.

In some embodiments, the collected information of step 202 or the generated features of step 204 can be stored in an updatable database, such as a general-purpose database management system (DBMS). Maintaining the set of collected information or the generated features in such a database allows placerank values to be recomputed or updated at appropriate times. For example, after a set of placerank values are produced, it may be desirable to update the function for computing the placerank values and recompute the placerank values using the updated function. In some embodiments, the DBMS can include MySQL, MariaDB, PostgreSQL, SQLite, MongoDB, Leveldb, Riak, HBase, Microsoft SQL Server, Oracle, SAP, dBASE, FoxPro, IBM DB2, LibreOffice Base and FileMaker Pro.

In some embodiments, the PG module 112 or the QR module 114 is configured to order search results based on placerank values. For example, when the server 102 responds to an information request from a client 106, the PG module 112 or the QR module 114 can retrieve EOIs that are potentially relevant to a query in the information request. Then the PG module 112 or the QR module 114 can retrieve placerank values associated with the potentially relevant EOIs. Subsequently, the PG module 112 or the QR module 114 can order the potentially relevant EOIs based on the placerank values associated with the potentially relevant EOIs.

In some embodiments, the disclosed mechanism for computing placerank values can be extended to a variety of EOIs, including products, companies, people, services, or websites.

Figure 5:
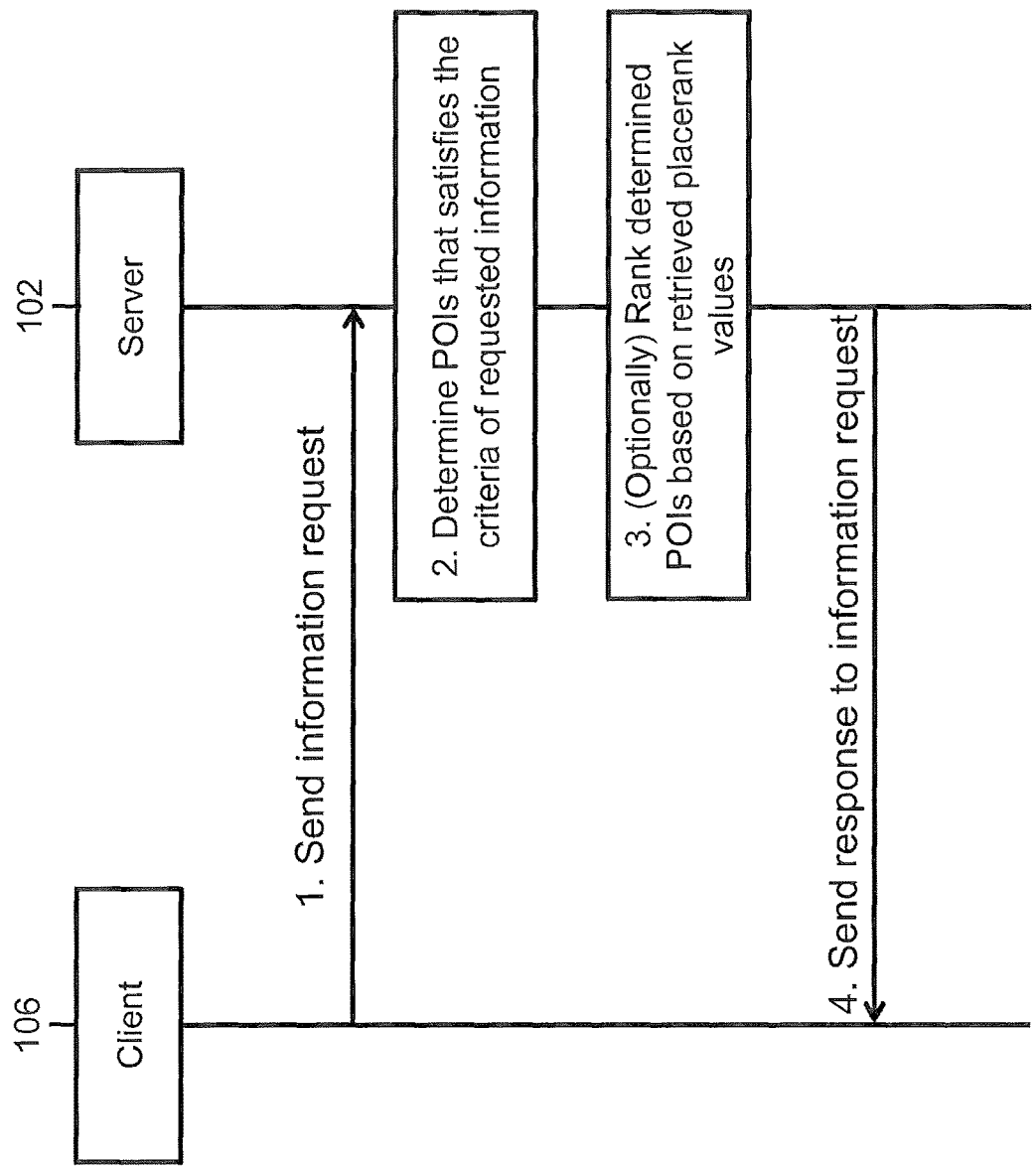
FIG. 5 illustrates an interaction between a client and a server based on placerank values associated with EOIs in accordance with some embodiments.

FIG. 5 illustrates an interaction between a client and a server based on placerank values associated with EOIs in accordance with some embodiments. The server 102 can include a QR module 114 that is configured to communicate with the client 106 to provide information to the client 106.

In step 1, the QR module 114 of the server 102 can receive, from the client 106, an information request. The information request can include one or more search terms, requesting the QR module 114 to provide a list of EOIs (or any other relevant information) that satisfy (or match) the one or more search terms.

In step 2, in response to the information request, the QR module 114 can determine EOIs (or any other relevant information) that match the one or more search queries in the information request.

In some embodiments, the QR module 114 can determine the EOIs based on the placerank values associated with the EOIs. For example, in response to receiving the information request, the QR module 114 can receive placerank values of entities that may satisfy the one or more search queries in the information request. Then, the QR module 114 can determine the EOIs based on the received placerank values. For example, the QR module 114 can select, as the EOIs, 10 entities associated with 10 highest placerank values.

In some embodiments, if the information request from the client 106 includes an importance label, the QR module 114 can provide the importance label to the PG module 112 so that the PG module 112 can update the placerank values in view of the received importance label. Subsequently, the PG module 112 can provide the updated placerank values to the QR module 114 so that the QR module 114 can identify the EOIs based on the updated placerank values.

In step 3, if the PG module 112 has not ordered the determined EOIs based on the associated placerank values, the QR module 114 can optionally order (or rank) the determined EOIs based on one or more placerank values associated with the determined EOIs. And in step 4, the QR module 114 can provide the determined EOIs and the retrieved placerank values to the client 106 that requested the information.

In some embodiments, the PG module 112 or the QR module 114 can be configured to dynamically re-order EOIs based on one or more placerank values associated with the EOIs. The dynamic re-ordering mechanism can enable the server 102 to effectively order EOIs based on contextual information associated with the information request. For example, the PG module 112 or the QR module 114 can be configured to bias the ordering of the EOIs based on one or more contextual conditions in which the information request was received by the server 102.

In some embodiments, the contextual conditions can include time, a geographic location (e.g., a Global Positioning System data), an application that sent the information request, an identification or a profile of a user that sent the information request, and/or a client device that sent the information request. For example, if an application that sent the information request is a social check-in application, the PG module 112 or the QR module 114 can be configured to rate certain types of EOIs, such as restaurants, higher than other types of EOIs, such as warehouses, since users of the social check-in application generally visit restaurants more often than warehouses. The bias for the dynamic re-ordering can be learned using machine learning techniques. The bias can be represented as a function that combines multiple placerank values (e.g. child friendly and foodie) with different weights (e.g. multipliers for each placerank value and/or an addition constant into a composite score). In some cases, the function can also take into account other parameters, such as distance, for example, linearly, logarithmically, or exponentially.

In some embodiments, the context information can also include one or more features determined at query time. In some cases, the combination of features determined at query time can include information associated with or that is a part of the information request. The PG module 112 or the QR module 114 can combine the one or more features with one or more placerank values to determine a final score for a EOI. The PG module 112 or the QR module 114 can then use the final score to dynamically re-order the EOIs and send the reordered EOIs to a client device that sent the information request.

For example, the PG module 112 or the QR module 114 can be configured to receive a location, typically the location of the device, from a client device that sent the information request. This location information can be represented as a location identifier, such as a Global Positioning System (GPS) coordinate or a latitude/longitude coordinate pair, and can be included in the information request. For example, the PG module 112 or the QR module 114 can determine a physical distance or a travel time between the location provided by the client device and a particular EOI, and combine the distance and one or more placerank values of the particular EOI to determine a score for the particular EOI. The PG module 112 or the QR module 114 can repeat this process for each of the EOIs to generate a plurality of scores. Then, the PG module 112 or the QR module 114 can use the plurality of scores to reorder the EOIs, thereby taking into account the importance of an EOI and how far the EOI is from the location provided by the client device. In some cases, the PG module 112 or the QR module 114 can take into account the size of the EOI when combining the distance or the travel time with one or more placerank values. Oftentimes, a distance between an EOI and a location provided by the client device is computed based on a center of the EOI and a center of the location provided by the client device. This can be inaccurate when the EOI is large. For instance, a football stadium is significantly large, and a distance or a travel time to the football stadium can be significantly less when the size of the football stadium is taken into account. Therefore, the PG module 112 or the QR module 114 can be configured to take into account the size of the EOI when combining the distance or the travel time with one or more placerank values.

As another example, the PG module 112 or the QR module 114 can be configured to use the time at which the information request is received to dynamically reorder EOIs. For example, there is a slim chance that a person is interested in going to her accountant at 1 AM, but there is a significant chance that the person is interested in going to a bar at 1 AM. Therefore, the PG module 112 or the QR module 114 can combine time information with one or more placerank values associated with a particular EOI to determine a score for the particular EOI. Then, the PG module 112 or the QR module 114 repeat this process for EOIs to determine a plurality of scores for the EOIs, and use the plurality of scores to reorder the EOIs, thereby taking into account the importance of an EOI and a time at which the information request is received.

The PG module 112 or the QR module 114 can also combine two or more of these context information features with placerank values to dynamically re-order the EOIs based on two or more of these context features.

In some embodiments, the PG module 112 or the QR module 114 can combine one or more of these context information features with placerank values using a combination function. The combination function can be a linear function, a non-linear function, a kernel function, or any other function that is capable of mapping one or more of these context information features and one or more placerank values to a final score for a particular EOI.

In some embodiments, the client 106 can include user equipment of a cellular network. The user equipment communicates with one or more radio access networks and with wired communication networks. The user equipment can be a cellular phone having phonetic communication capabilities. The user equipment can also be a smart phone providing services such as word processing, web browsing, gaming, e-book capabilities, an operating system, and a full keyboard. The user equipment can also be a tablet computer providing network access and most of the services provided by a smart phone. The user equipment operates using an operating system such as Symbian OS, iPhone OS, RIM's Blackberry, Windows Mobile, Linux, HP WebOS, and Android. The screen might be a touch screen that is used to input data to the mobile device, in which case the screen can be used instead of the full keyboard. The user equipment can also keep global positioning coordinates, profile information, or other location information.

The client 106 also includes any platforms capable of computations. Non-limiting examples can include computers, netbooks, laptops, servers, and any equipment with computation capabilities. The client 106 is configured with one or more processors that process instructions and run software that may be stored in memory. The processor also communicates with the memory and interfaces to communicate with other devices. The processor can be any applicable processor such as a system-on-a-chip that combines a CPU, an application processor, and flash memory. The client 106 can also provide a variety of user interfaces such as a keyboard, a touch screen, a trackball, a touch pad, and/or a mouse. The client 106 may also include speakers and a display device in some embodiments.

In some embodiments, the server 102 can reside in a data center and form a node in a cloud computing infrastructure. The server 102 can also provide services on demand. A module hosting a client is capable of migrating from one server to another server seamlessly, without causing program faults or system breakdown. The server 102 on the cloud can be managed using a management system.

Other embodiments are within the scope and spirit of the disclosed subject matter.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium. Indeed "module" is to be interpreted to include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The terms "a" or "an," as used herein throughout the present application, can be defined as one or more than one. Also, the use of introductory phrases such as "at least one" and "one or more" should not be construed to imply that the introduction of another element by the indefinite articles "a" or "an" limits the corresponding element to only one such element. The same holds true for the use of definite articles.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

What is claimed is:

1. An information analytics system for analyzing information related to entities of interest and establishing rankings, the information analytics system comprising:
a processor configured to acquire computer readable instructions stored in one or more memory devices and execute the instructions to:
process data relating to an entity of interest, the data comprising:
external data received from external data sources;
internal data comprising data previously received from external data sources and maintained on an internal database; and
server traffic data comprising one or more of a quantity, timing,
frequency, and change in frequency, of server requests related to the entity of interest received from server logs;
determine an association between the external data for the entity of interest and the internal data for the entity of interest by matching one or more attributes of the external data to the internal data;
generate from the processed data a plurality of features comprising summary attributes associated with a particular aspect of the entity of interest;
generate data comprising a computation of a score for the entity of interest using the plurality of features, the computation comprising a weighted combination of the plurality of features, wherein the score is to indicate an importance of the entity of interest;
process data comprising an information request received from a client computing device including a query, wherein the information request is to request information on one or more entities associated with the query;
identify the at least one entity associated with the query based on at least one score associated with the at least one entity;
order the at least one entity based on the at least one score using a sorting mechanism; and initiate transmission of data comprising the at least one entity to the client computing device, wherein the processor is to further execute the one or more computer instructions to modify the order of the at least one entity by altering one or more scores of the at least one entity based on one or more contextual conditions associated with the information request, the one or more contextual conditions associated with the information request comprising at least one of: a time at which the information request is received, a geographic location from which the information request is received, an application from which the information request is received, a profile of a user from which the information request is received, or a type of the computing device that sent the information request.

2. The information analytics system of claim 1, wherein the plurality of features comprises an aggregate count of data items in an internal dataset relating to the entity of interest.

3. The information analytics system of claim 1, wherein the plurality of features comprises an information request feature to indicate a number of information requests received by the apparatus for information relating to the entity of interest.

4. The information analytics system of claim 3, wherein an information request is associated with one of a plurality of information request types, and the information request feature is also indicative of a total number of information requests received by the apparatus and associated with each of the plurality of information request types.

5. The information analytics system of claim 1, wherein the plurality of features is normalized to a common scale.

6. The information analytics system of claim 1, wherein the processor is to further execute the one or more computer instructions to determine weights for the weighted combination based on importance labels indicating an importance of each of the plurality of features.

7. The information analytics system of claim 1, wherein the processor is to further execute the one or more computer instructions to compute the score for the entity of interest by computing exponentiations of the plurality of features.

8. A method for analyzing information related to entities of interest and establishing rankings, the method comprising:
  processing data relating to an entity of interest, the data comprising:
    external data received from external data sources;
    internal data comprising data previously received from external data sources and maintained on an internal database; and
    server traffic data comprising one or more of a quantity, timing, frequency, and change in frequency, of server requests related to the entity of interest received from server logs;
  determining an association between the external data for the entity of interest and the internal data for the entity of interest by matching one or more attributes of the external data to the internal data;
  generating from the processed data a plurality of features comprising summary attributes associated with a particular aspect of the entity of interest;
  generating data comprising a computation of a score for the entity of interest using the plurality of features, the computation comprising a weighted combination of the plurality of features, wherein the score is to indicate an importance of the entity of interest;
  receiving, from a client computing device, data comprising an information request including a query requesting information on one or more entities associated with the query;
  identifying at least one entity associated with the query based on at least one score associated with the at least one entity;
  ordering the at least one entity based on the at least one score using a sorting mechanism; and
  initiating transmission of data comprising information on the at least one entity to the computing device wherein the method further comprises altering one or more scores of the at least one entity based on one or more contextual conditions associated with the information request, the one or more contextual conditions associated with the information request comprising at least one of: a time at which the information request is received, a geographic location from which the information request is received, an application from which the information request is received, a profile of a user from which the information request is received, or a type of the computing device that sent the information request.

9. The method of claim 8, wherein the plurality of features comprises an aggregate count of data items in an internal dataset relating to the entity of interest.

10. The method of claim 8, wherein the plurality of features comprises an information request feature to indicate a number of information requests received relating to the entity of interest.

11. The method of claim 10, further comprising associating an information request with one of a plurality of information request types, and wherein the information request feature is also indicative of a total number of information requests received and associated with each of the plurality of information request types.

12. The method of claim 8, further comprising normalizing the plurality of features to a common scale.

13. The method of claim 8, further comprising determining weights for the weighted combination based on importance labels indicating an importance of each of the plurality of features.

14. The method of claim 8, further comprising computing the score for the entity of interest by computing exponentiations of the plurality of features.

15. A non-transitory computer readable medium having computer instructions executable by one or more processors to:
  process data relating to an entity of interest, data comprising:
    external data received from external data sources;
    internal data comprising data previously received from external data sources and maintained on an internal database; and
    server traffic data comprising one or more of a quantity, timing, frequency, and change in frequency, of server requests related to the entity of interest received from server logs;
  determine an association between the external data for the entity of interest and the internal data for the entity of interest by matching one or more attributes of the external data to the internal data;
  generate from the processed data a plurality of features comprising summary attributes associated with a particular aspect of the entity of interest;
  generate data comprising a computation of a score for the entity of interest using the plurality of features, the computation comprising a weighted combination of the plurality of features, wherein the score is to indicate an importance of the entity of interest;

process data comprising an information request received from a client computing device including a query, wherein the information request is to request information on one or more entities associated with the query;

identify the at least one entity associated with the query based on at least one score associated with the at least one entity;

order the at least one entity based on the at least one score using a sorting mechanism; and initiate transmission of data comprising the at least one entity to the client computing device, wherein the processor is to further execute the one or more computer instructions to modify the order of the at least one entity by altering one or more scores of the at least one entity based on one or more contextual conditions associated with the information request, the one or more contextual conditions associated with the information request comprising at least one of: a time at which the information request is received, a geographic location from which the information request is received, an application from which the information request is received, a profile of a user from which the information request is received, or a type of the computing device that sent the information request.

16. The non-transitory computer readable medium of claim 15, wherein the plurality of features comprises an aggregate count of data items in an internal dataset relating to the entity of interest.

17. The non-transitory computer readable medium of claim 15, wherein the plurality of features comprises an information request feature to indicate a number of information requests received by the apparatus for information relating to the entity of interest.

18. The non-transitory computer readable medium of claim 17, wherein an information request is associated with one of a plurality of information request types, and the information request feature is also indicative of a total number of information requests received and associated with each of the plurality of information request types.

19. The non-transitory computer readable medium of claim 15, wherein the plurality of features is normalized to a common scale.

20. The non-transitory computer readable medium of claim 15, wherein the computer instructions are further executable by the one or more processors to determine weights for the weighted combination based on importance labels indicating an importance of each of the plurality of features.

21. The non-transitory computer readable medium of claim 15, wherein the computer instructions are further executable by the one or more processors to compute the score for the entity of interest by computing exponentiations of the plurality of features.

* * * * *